United States Patent [19]
Tanaka et al.

[11] Patent Number: 5,657,144
[45] Date of Patent: Aug. 12, 1997

[54] OPTICAL PROCESSING DEVICE OPERATING IN A WAVELENGTH-SYNCHRONIZED MODE AND AN OPTICAL CIRCUIT EXCHANGER THAT USES SUCH AN OPTICAL PROCESSING DEVICE

[75] Inventors: Kazuhiro Tanaka; Kiyohide Wakao; Hiroyuki Nobuhara; Nobuhiro Fujimoto; Hiroyuki Rokugawa; Satoshi Kuroyanagi, all of Kawasaki, Japan

[73] Assignee: Fujitsu Limited, Kawasaki, Japan

[21] Appl. No.: 485,116

[22] Filed: Jun. 7, 1995

Related U.S. Application Data

[62] Division of Ser. No. 293,598, Aug. 22, 1994, which is a division of Ser. No. 167,122, Dec. 16, 1993, abandoned, which is a continuation of Ser. No. 819,212, Jan. 10, 1992, abandoned.

[30] Foreign Application Priority Data

Jan. 10, 1991 [JP] Japan .................................. 3-12373
Feb. 8, 1991 [JP] Japan .................................. 3-37850

[51] Int. Cl.⁶ .................................................. H04J 14/02
[52] U.S. Cl. .................................................. 359/128
[58] Field of Search .................................. 359/117, 123, 359/128, 124, 126, 127, 125

[56] References Cited

U.S. PATENT DOCUMENTS

| | | | |
|---|---|---|---|
| 4,742,576 | 5/1988 | McMahon | 359/126 |
| 4,783,850 | 11/1988 | McDonald | 359/128 |
| 4,845,703 | 7/1989 | Suzuki | 359/117 |
| 4,989,199 | 1/1991 | Rzeszewski | 359/123 |
| 5,005,166 | 4/1991 | Suzuki | 359/123 |
| 5,099,347 | 3/1992 | Daniele | 359/123 |
| 5,175,777 | 12/1992 | Böttle | 359/128 |

FOREIGN PATENT DOCUMENTS

| | | |
|---|---|---|
| 0 223 258 | 5/1987 | European Pat. Off. . |
| 0 249 112 | 12/1987 | European Pat. Off. . |
| 0181294 | 7/1989 | Japan .................................. 359/117 |

OTHER PUBLICATIONS

*Patent Abstracts of Japan*, vol. 8, No. 39 (E–228)[1476] Feb. 21, 1984 & JP–A–58 196796 (Nippon Denki K.K.) Nov. 16, 1983.

Chraplyvy et al., "Narrowband Tunable Optical Filter for Channel Selection in Densely Packed WDM Systems," *Electronics Letters*, vol. 22, No. 20, Sep. 25, 1986, pp. 1084–1085.

*Patent Abstracts of Japan*, vol. 11, No. 240 (E–529)[2687] Aug. 6, 1987 & JP–A–62 051895 (NEC Corp.) Mar. 6, 1987.

Smith et al., "Optical Processing in Future Coherent Networks," *Conference Record, IEEE/IEICE Global Telecommunications Conference 1987*, vol. 1, Nov. 15–18, 1987, pp. 678–683.

Hinton, H. Scott, "Architectural Considerations for Photonic Switching Networks," *IEEE Journal on Selected Areas in Communication*, vol. 6, No. 7, Aug. 1988, pp. 1209–1226 (XP 000068606).

(List continued on next page.)

Primary Examiner—Leslie Pascal
Attorney, Agent, or Firm—Staas & Halsey

[57] ABSTRACT

An optical processing device for converting a wavelength of an optical signal comprises an optical processing unit supplied with an input optical beam carrying thereon one or more optical signals with respective wavelengths that are different from each other, the optical processing means being further supplied with a control optical beam having a stabilized reference wavelength and selecting the optical signal that has a first wavelength and outputting the same with a second wavelength that is specified by the reference wavelength; and a control Unit for controlling the optical processing unit by specifying the first wavelength of the optical beam to be selected.

6 Claims, 18 Drawing Sheets

OTHER PUBLICATIONS

Kawaguchi et al., "Tunable Optical–Wavelength Conversion Using an Optically Triggerable Multielectrode Distributed Feedback Laser Diode," *IEEE Journal of Quantum Electronics*, vol. 24, No. 11, Nov. 1988, pp. 2153–2159 (XP 000105699).

Oda et al., "Channel Selection and Stabilization Technique for a Waveguide–Type 16–Channel Frequency Selection Switch for Optical FDM Distribution Systems," *IEEE Photonics Technology Letters*, vol. 1, No. 6, Jun. 1989, pp. 137–139.

Linke, R.A., "Frequency Division Multiplexed Optical Networks Using Heterodyne Detection," *IEEE Network: The Magazine of Computer Communications*, vol. 3, No. 2, Mar. 1989, New York, NY, pp. 13–20 (XP26492).

Suzuki et al., "A Photonic Wavelength–Division Switching System Using Tunable Laser Diode Filters," *IEEE International Conference on Communications*, Conference Record, vol. 2 of 3, Jun. 11–14, 1989, Boston, MA, pp. 722–727 (XP75238).

Fujiwara et al., "Photonic Switching Systems Using Coherent Optical Transmission Technologies," *Proceedings of the Fourth Tirrenia International Workshop on Digital Communications: Coherent Optical Communications and Photonic Switching*, Sep. 19–23, 1989, pp. 349–364 (XP 0001640007).

*Patent Abstracts of Japan*, vol. 13, No. 463 (E–833)[3811] Oct. 19, 1989 & JP–A–01 181294 (Fujitsu Ltd) Jul. 19, 1989.

Fujiwara et al., "A Coherent Photonic Wavelength–Division Switching System for Broad–Band Networks," *Journal of Lightwave Technology*, vol. 8, No. 3, Mar. 1990, New York, NY, pp. 416–422 (XP136396).

TO OTHER GROUPS

F I G . 20
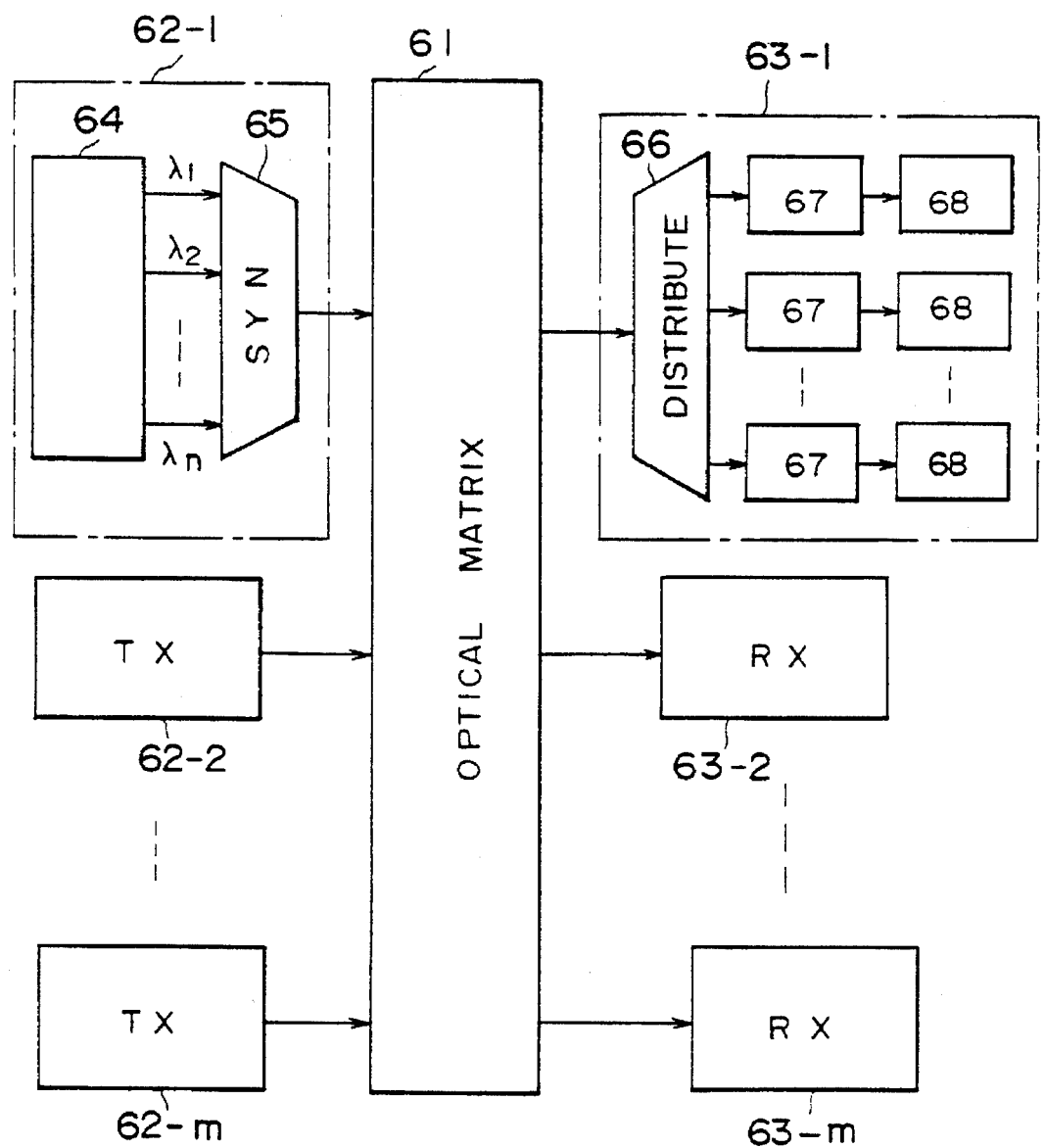

OPTICAL PROCESSING DEVICE OPERATING IN A WAVELENGTH-SYNCHRONIZED MODE AND AN OPTICAL CIRCUIT EXCHANGER THAT USES SUCH AN OPTICAL PROCESSING DEVICE

This application is a division of application Ser. No. 08/293,598 filed Aug. 22, 1994, still pending, in turn a division of application Ser. No. 08/167,122, filed Dec. 16, 1993, now abandoned, which was a continuation of application Ser. No. 07/819,212, filed Jan. 10, 1992, now abandoned.

BACKGROUND OF THE INVENTION

The present invention generally relates to optical processing systems and more particularly to a wavelength-synchronized optical processing device that produces an optical signal having a wavelength that is synchronized to a stabilized wavelength of a reference optical beam and various optical information processing systems that use such an optical processing device.

With the extensive deployment of optical telecommunication networks, studies are made on the optical transmission and reception in the optical exchange systems and optical subscriber systems. Among others, there is a proposal to transmit a plurality of optical signals having different wavelengths on a common optical fiber or optical waveguide in the wavelength multiplex mode. In such a wavelength multiplex transmission of optical signals, it is necessary to superpose (i.e., multiplex) the optical signals with sufficient wavelength interval such that a reception side can demultiplex the received optical signal into individual optical signal components with reliability. In such wavelength multiplex systems, it will be easily understood that the change or fluctuation of the oscillation wavelength occurring in the optical signals causes a disastrous effect in the operation of the reception side systems.

FIG. 1 shows the block diagram of a conventional optical processing system that uses a wavelength converter $1a$.

Referring to FIG. 1, the wavelength converter $1a$ is supplied with an input optical signal having a wavelength of $\lambda_0$ and produces an output optical signal with a wavelength of $\lambda_1$. There, the wavelength converter converts the wavelength of the input optical signal to a second wavelength, and the optical signal having the wavelength $\lambda_1$ is divided out from the converted optical signal in response to a reference optical beam, supplied given externally, having the wavelength $\lambda_1$.

More specifically, the output optical signal of the wavelength converter $1a$ is supplied to an optical divider $2a$ that divides the incident optical beam into a first output beam corresponding to the output optical signal and a second output beam, and the second output beam is supplied to a wavelength comparator $3a$. The wavelength comparator $3a$ is further supplied with the reference optical beam and produces an electric output indicative of the difference between the wavelength of the output optical signal of the converter $1a$ and the wavelength $\lambda_1$ of the reference optical beam.

The output electric signal of the comparator $3a$ is supplied to a controller $4a$ that in turn produces a control signal for controlling the operation of the wavelength converter $1a$. According to this system, one can convert the wavelength $\lambda_0$ of the incident optical signal to the wavelength $\lambda_1$ by controlling the converter $1a$ such that the output of the wavelength comparator $3a$ becomes zero. The wavelength converter $1a$ may be formed by using a DFB laser diode that can change the oscillation wavelength thereof by controlling the bias current or temperature.

FIG. 2 shows another conventional wavelength conversion system wherein an input optical signal having a wavelength $\lambda_0$ is supplied to a photoelectric converter $1b$ that produces an electric output in response to the incident optical signal. The output electric signal is supplied to a clock extraction circuit $2b$ wherein a clock signal is extracted from the information that is modulated on the input optical signal. The clock extraction circuit further discriminates the logic level of the binary information signal modulated on the input optical beam with a timing given by the clocks, and drives an optical modulator $3b$. The optical modulator $3b$ is thereby supplied with a reference optical beam with the wavelength $\lambda_1$ and modulates the same in accordance with the electric output of the clock extraction circuit $2b$. As a result, an optical output signal is obtained with the wavelength $\lambda_1$.

In any of these conventional optical processing systems, there has been a problem in that the normal operation of the system is not achieved when there is a fluctuation in the wavelength of the input optical beam. It should be noted that, in the telecommunication systems, there is no guarantee that the transmission side uses the stabilized optical source with respect to the oscillation wavelength. Further, such a fluctuation of the wavelength of the optical signal may be caused as a result of the dispersion of optical pulses that occur in the optical fibers. Thus, the optical transmission system is not only required to eliminate the fluctuation of the wavelength of the optical source at the transmission side but is also required to have an ability to adapt to the fluctuation of wavelength and to eliminate the same at the reception side or at any intermediate locations between the transmission side and the reception side.

SUMMARY OF THE INVENTION

Accordingly, it is a general object of the present invention to provide a novel and useful wavelength-synchronized optical processing device, wherein the foregoing problems are eliminated.

Another and more specific object of the present invention is to provide a wavelength-synchronized optical processing device for use in an optical transmission system wherein the optical processing device is capable of eliminating the fluctuation of wavelength from an optical beam that is transmitted through the optical transmission system.

Another object of the present invention is to provide a wavelength-synchronized optical processing device comprising an optical processing unit supplied with an input optical beam carrying thereon one or more optical signals having respective, mutually different wavelengths, for producing an output optical signal with a wavelength specified by the wavelength of a reference optical beam that is supplied to the optical processing unit externally, and a controller for controlling the operation of the optical processing unit. According to the present invention, one can select any optical signal component of the desired wavelength from the optical signals modulated on the input optical beam in the wavelength-multiplexed mode. Thereby, the wavelength of the input optical signal is synchronized to the stabilized wavelength of the reference optical beam and one can obtain the output optical signals of an accurate wavelength even when there is a substantial fluctuation in the wavelength of the incident optical signals.

In a preferred embodiment, the optical processing unit comprises a variable wavelength filter supplied with the input optical signal and controlled by the controller for selectively passing the optical signal having the wavelength specified by the wavelength of the reference optical beam, a photoelectric converter supplied with an optical output of the variable wavelength filter for converting the same to an electric signal, and an optical modulator supplied with the output electric signal of the photoelectric converter for modulating an optical beam having the wavelength of the reference optical beam in response to the electric signal. According to the present invention, one can extract a desired optical beam having a wavelength that is synchronized to the reference wavelength from the wavelength-multiplexed input optical beam. The optical processing unit may further include a wavelength converter for converting the wavelength of the output optical beam to a desired wavelength. Thereby, one can reestablish the wavelength multiplexed of the optical signals with the interval wavelength set stably.

Another object of the present invention is to provide an optical switching system comprising an electro-optic converter supplied with input electric signals of different channels for producing optical signals in correspondence to the input electric signals with respective, mutually different wavelengths, an optical distribution unit supplied with the output optical signals from the electro-optic converter for merging and distributing the optical signals into a plurality of physically separated optical channels, and a wavelength-synchronized optical processing device provided on each of the optical channels for producing a stabilized optical output that has a wavelength stabilized with respect to the wavelength of a reference optical beam, and a reference beam generator for producing the reference optical beam with a stabilized wavelength. According to the present invention, one can direct the information signal to any desired optical channels by merging the optical signals at the optical distribution unit and recovering the original information therefrom at the wavelength-synchronized optical processing device by selecting the wavelength of the reference optical beam produced by the reference beam generator. Thereby, the exchange of signals between a huge number of channels is achieved with a simple construction of the switching system.

In a preferred embodiment of the present invention, the optical channels are grouped into a plurality of channel groups each including a plurality of channels, and the reference beam generator supplies the reference optical beam to the plurality of channel groups commonly such that the wavelength of the reference beam is changed in each channel in one channel group.

Another object of the present invention is to provide an optical switching system comprising a plurality of input-side optical channels for guiding wavelength-multiplexed optical signals therethrough, a plurality of output-side channels for guiding output optical signals therethrough, each of said input-side optical channels and each of said output-side optical channels being crossed with each other at a node, wherein there is provided a wavelength-synchronized optical processing device in correspondence to each node, said optical processing device comprising: an optical processing unit supplied with said wavelength-multiplexed input optical signal and a reference optical beam having a reference wavelength for transferring selectively an optical signal that has a wavelength specified by the reference wavelength from the optical input channel to the optical output channel; and a reference beam generator for producing the reference optical beam with said reference wavelength. According to the present invention, the transfer of optical signals from the plurality of input-side optical channels to a desired output-side optical channel is achieved while simultaneously stabilizing the wavelength of the output optical beam on the output-side optical channel. Further, a number of optical output signals having different wavelengths are multiplexed on the output-side optical channel at the plurality of nodes, thereby providing a wavelength-multiplexed optical signal with stabilized wavelengths.

In a preferred embodiment, one may provide intermediate optical channels to link the input-side optical channels and the output-side optical channels, with the optical processing unit and the reference beam generator provided at each node between the input-side optical channels and the intermediate optical channels and further at each node between the intermediate optical channels and the output-side optical channels.

Another object of the present invention is to provide a variable-wavelength filter device that is supplied with a control signal having a controlled wavelength for selectively transmitting an incident optical beam that has a wavelength specified by the controlled wavelength.

Other objects and further features of the present invention will become apparent from the following detailed description when read in conjunction with the attached drawings.

BRIEF DESCRIPTION OF THE DRAWINGS

FIG. 20 is a block diagram showing the construction of the optical transmission system according to a twelfth embodiment of the present invention.

DETAILED DESCRIPTION OF THE PREFERRED EMBODIMENTS

Figure 1:
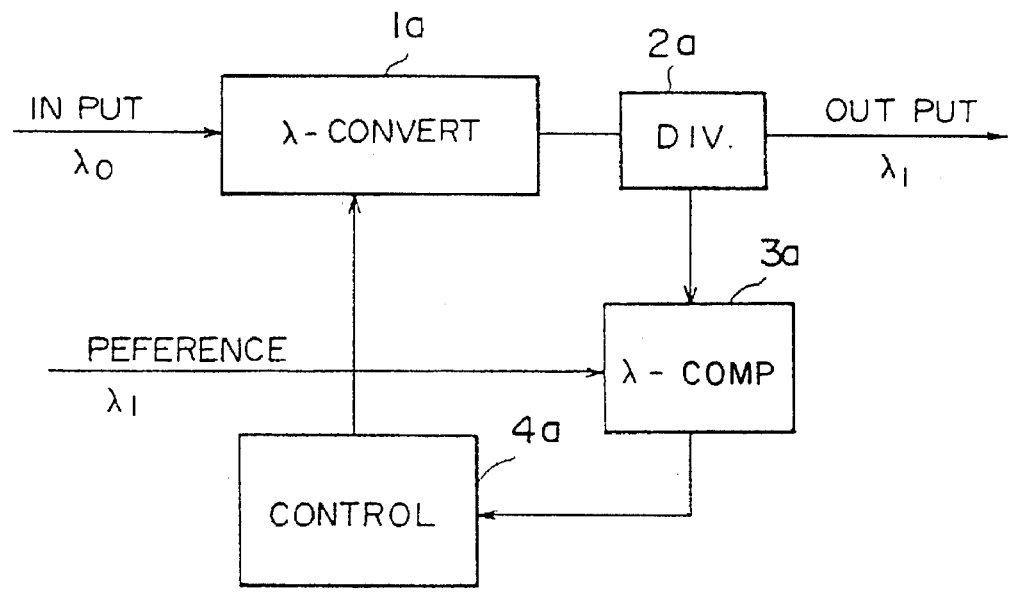
FIG. 1 is a block diagram showing the construction of a conventional wavelength conversion circuit used in an optical transmission system.
Figure 2:
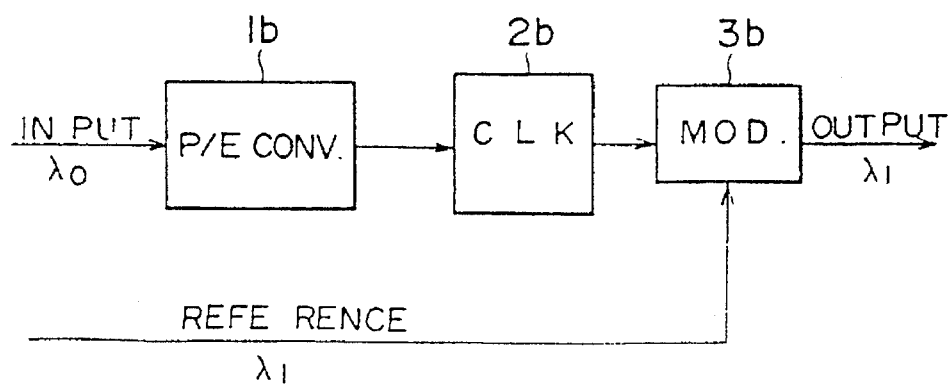
FIG. 2 is a block diagram showing another conventional wavelength conversion circuit.
Figure 3:
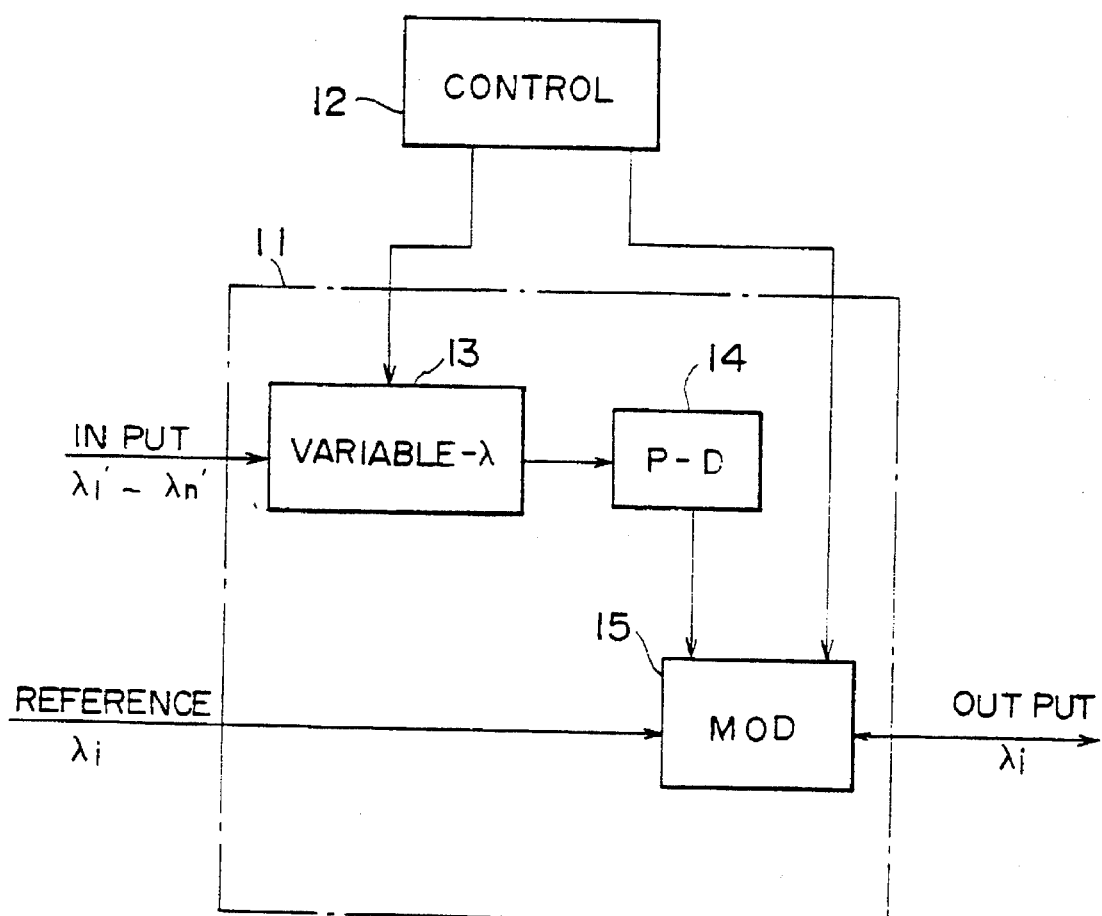
FIG. 3 is a block diagram showing the construction of the wavelength-synchronized optical processing device according to a first embodiment of the present invention.

FIG. 3 shows the general construction of the wavelength-synchronized optical processing device according to a first embodiment of the present invention. The optical processing device of FIG. 3 is an optical demultiplexer that selectively recovers an optical signal component from a wavelength-multiplex optical signal modulated on an input optical beam, in response to a reference optical beam that specifies the wavelength of the optical signal to be recovered.

Referring to FIG. 3, the optical processing device includes an optical processing unit 11 and a control unit 12, wherein the optical processing unit 11 comprises, generally, a variable-wavelength band pass filter 13, a photodetector 14 and an optical modulation unit 15. The band pass filter 13 of the optical processing unit 11 is supplied with an incident optical beam and controlled by the control unit 12 such that only the optical signal that has a particular wavelength specified by the control unit 12 is passed through the filter 13.

The output optical beam of the filter 13 is supplied to the photodetector 14 wherein the photodetector 14 converts the optical beam to an electric signal. The output electric signal of the photodetector 14 is supplied to the optical modulation unit 15 and the optical modulation unit 15 modulates the reference optical beam in response to the electric output of the photodetector 14. As will be described later in detail, the filter 13 may be formed of a DFB laser amplifier and changes the wavelength of the optical beam passing therethrough in response to a bias current that is controlled below the threshold of laser oscillation. The optical modulation unit 15 may be a Franz-Keldysh effect device or a laser diode, the gain of which can be changed in response to the output of the photodetector 14.

In operation, an input optical beam that carries thereon optical signals having respective wavelengths $\lambda_1'-\lambda_n'$ in the wavelength-multiplex mode is supplied to the filter 13 that in turn is controlled by the control unit 12 to pass selectively, the optical signal having the wavelengths $\lambda_i'$. Meanwhile, the wavelength of the reference beam is well stabilized by using a stabilized optical source such as a laser diode of which operational temperature and bias current are compensated for with respect to any variation. Thereby, one obtains the output optical signal from the optical modulation unit 15 with the wavelength $\lambda_i$ in correspondence to foregoing original optical signal of the wavelength $\lambda_i'$. The circuit 11 can be formed as an integrated circuit including the control unit 12.

Figure 4:
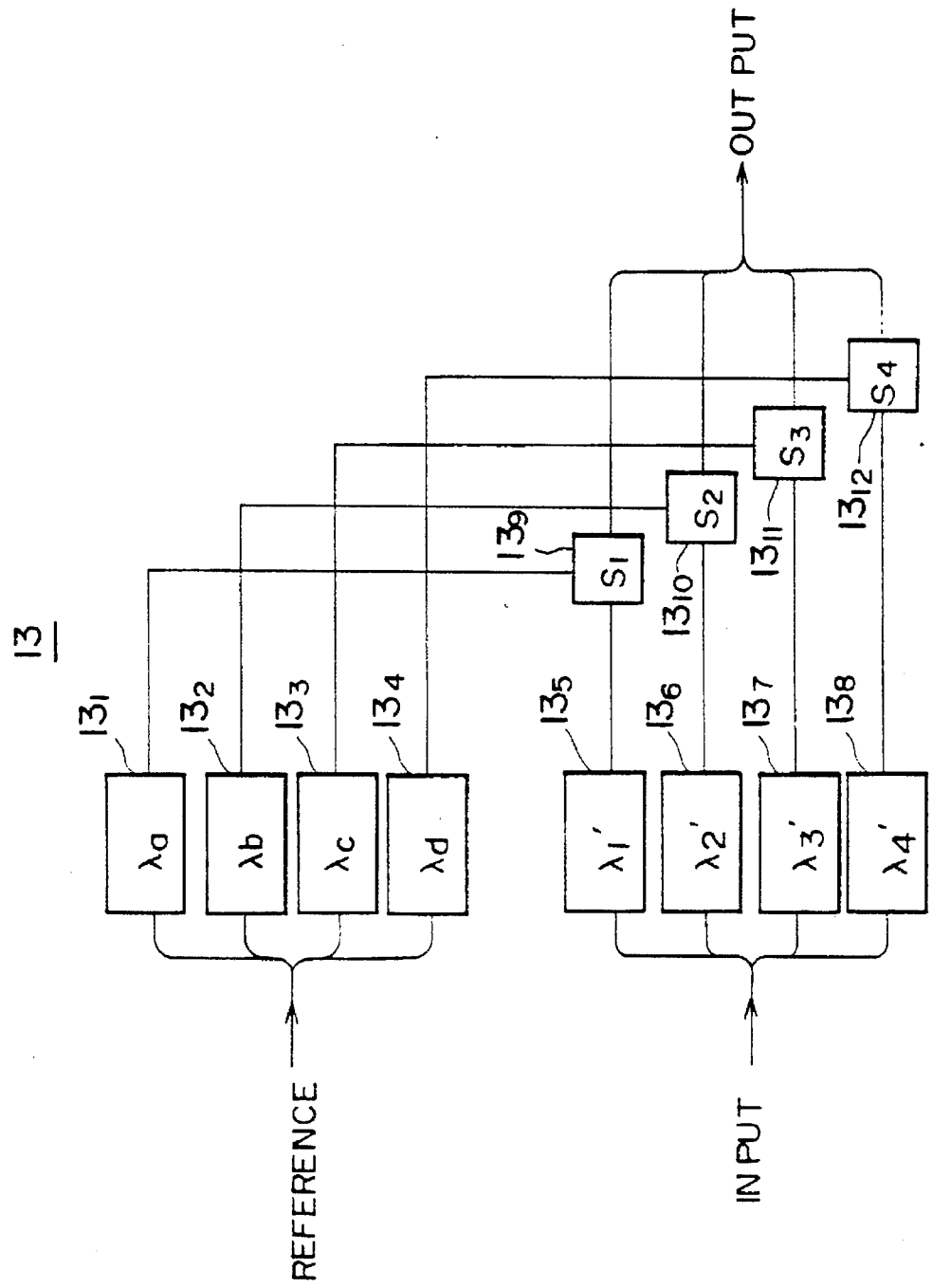
FIG. 4 is a block diagram showing the construction of a variable wavelength filter used in the optical processing device of FIG. 3.

FIG. 4 shows the construction of the filter 13 used in the system of FIG. 3.

Referring to FIG. 4, the filter 13 includes a number of filter elements $13_1-13_4$ respectively passing the optical beams of the wavelengths $\lambda_a-\lambda_d$, as well as a number of filter elements $13_5-13_8$ respectively passing the optical beams of the wavelengths $\lambda_1'-\lambda_4'$, wherein the wavelength-multiplexed input optical beam is supplied to each of the filter elements $13_5-13_8$ in parallel with each other. Further, the reference optical beam is supplied in parallel to each of the filter elements $13_1-13_4$.

The output optical beams of the filter elements $13_5-13_8$ are supplied to corresponding variable transmittance controllers $13_9-13_{12}$ each having a transmittance that is controlled in response to the output of the corresponding filter element. Thus, for the reference optical with the wavelength of $\lambda_a$, the transmittance of the controller $13_9$ is selectively increased and the optical signal having the wavelength $\lambda_1'$ is passed through the filter element $13_5$ and selectively outputted as an output optical beam of the filter 13.

In the present embodiment, one may employ any of the multi-layered dielectric films, optical waveguides, or the spatial filters that use the diffraction grating, for the filter element $13_5-13_9$. Preferably, the wavelengths $\lambda_a$, $\lambda_b$, $\lambda_c$ and $\lambda_d$ may be set coincident to the wavelengths $\lambda_1'$, $\lambda_2'$, $\lambda_3'$ and $\lambda_4'$ such that $\lambda_a=\lambda_1'$, $\lambda_b=\lambda_2'$, $\lambda_c=\lambda_3'$ and $\lambda_d=\lambda_4'$. This, of course, is not the essential requirement for the operation of the device.

Figure 5:
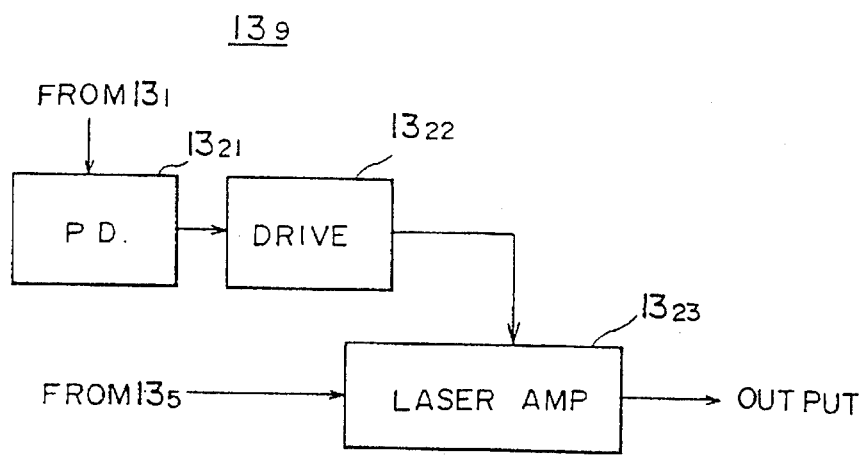
FIG. 5 is a block diagram showing another example of the variable wavelength filter of FIG. 4.

FIG. 5 shows an example of the variable transmittance controllers $13_9-13_{12}$, wherein the input optical signal from one of the filters $13_5-13_9$ is supplied to a laser amplifier $13_{23}$ for amplification by the stimulated emission caused therein in response to the passage of the wavefront of the input optical beam. The operation of the laser amplifier $13_{23}$ is controlled by an electronic control drive circuit $13_{22}$ that in turn is controlled in response to an electric signal produced by a photodetector $13_{21}$ to which the reference optical beam is supplied.

More specifically, the electronic circuit $13_{22}$ produces a bias signal which is supplied to the laser amplifier $13_{23}$ when there is an incident reference optical beam applied to the photodetector $13_{21}$. In response to the bias signal, the laser amplifier $13_{23}$ amplifies the incident input optical signal, while when there is no bias signal, the laser amplifier $13_{23}$ absorbs the input optical signal. For the variable transmittance controllers, one may use, in addition to the foregoing laser amplifier, a Franz-Keldysh effect device or MQW optical modulator that uses the quantum confinement Stark effect.

Figure 6:
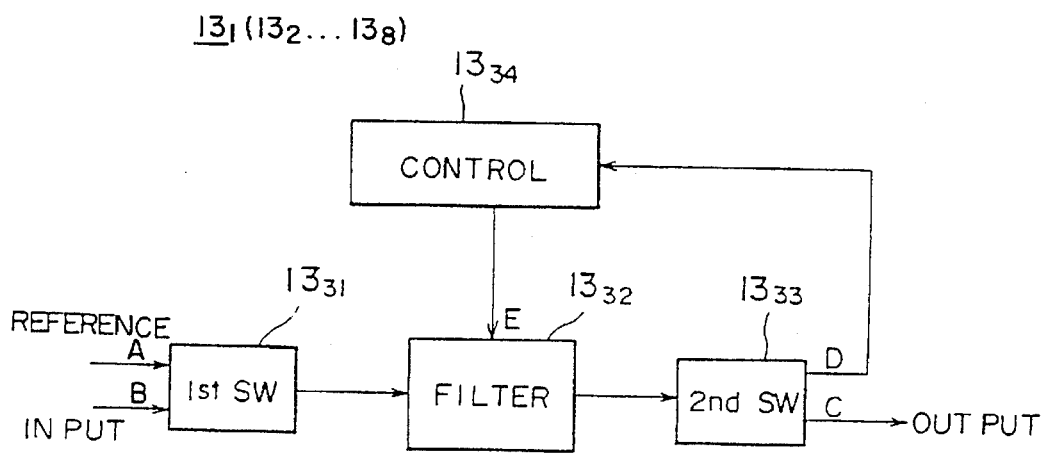
FIG. 6 is a block diagram showing still another construction of the variable wavelength filter of FIG. 4.

FIG. 6 shows another embodiment of the variable-wavelength filter 13, (representative of each of filters $13_1$ to $13_8$ in FIG. 4) wherein there is provided an optical switch $13_{31}$ that has a first input port A for receiving a reference optical beam and a second input port B for receiving the input optical beam, wherein one of the optical beams at the input port A and the input port B is supplied selectively to a filter device $13_{32}$, the wavelength of which is controlled by a controller $13_{34}$. The optical beam that has passed through the filter device $13_{32}$ is supplied to a second optical switch $13_{33}$ that has a first output port C connected to an output waveguide (not shown) and a second output port D connected to the controller $13_{34}$.

In operation, the first optical switch $13_{31}$ is set at first such that the input port B is selected. Further, the second optical switch $13_{33}$ is set such that the output port D is selected. In this state, the reference optical beam supplied to the input port B is transferred to the controller $13_{34}$ after passing through the filter device $13_{32}$ and the switch $13_{33}$. Thereby, the controller $13_{34}$ sets the state of the filter device $13_{32}$ such that the transmittance of the optical beam becomes a maximum. After such training of the filter device $13_{32}$ is completed, the state of each of the optical switches $13_{31}$ and $13_{33}$ is switched such that the input optical beam at the port A is outputted at the port C after passing through the filter device $13_{32}$. Thereby, only the optical signal that has the wavelength coincident to the wavelength of the filter device $13_{32}$ appears at the output port C. In other words, the system 13 acts as the variable-wavelength filter that selectively passes the optical signal having a wavelength coincident to the wavelength of the reference optical beam.

Figure 7:
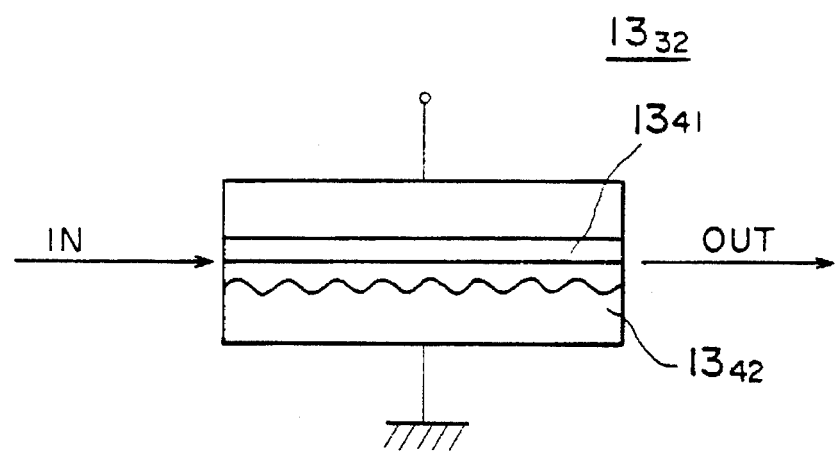
FIG. 7 is a diagram showing the structure of a semiconductor optical device used in the variable wavelength filter of FIG. 6.

FIG. 7 shows the construction of the filter device $13_{32}$.

Referring to FIG. 7, the filter device $13_{32}$ is formed of a DFB laser diode that has an active layer $13_{41}$ and a diffraction grating $13_{42}$. In operation, the device is biased below the threshold of laser oscillation. Thereby, the incident optical beam causes a stimulated emission in the active layer $13_{41}$ upon passage therethrough.

Figure 8:
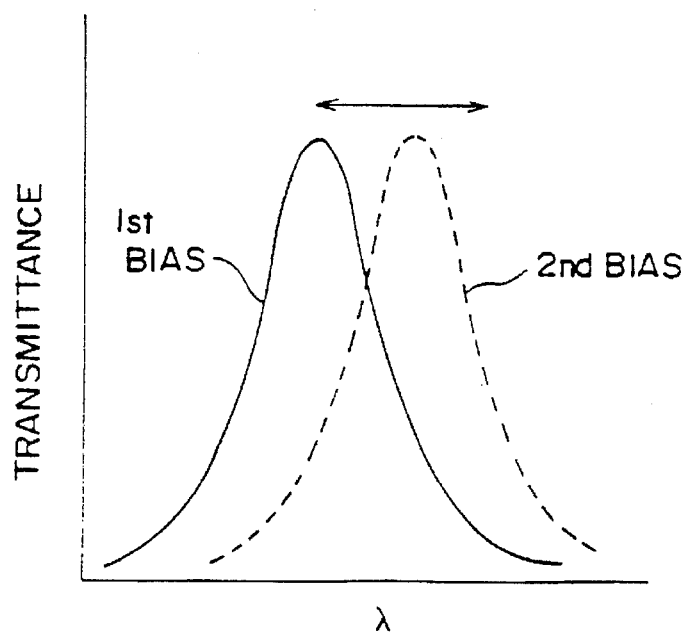
FIG. 8 is a diagram showing the operational characteristics of the device of FIG. 7.

FIG. 8 shows the band-pass characteristics of the laser amplifier of FIG. 7 for different bias voltages. As can be seen in FIG. 8, the peak of the transmittance shifts in response to the bias voltage. By using this effect, one can set the pass-band or pass-wavelength in the filter device by means of the controller $13_{43}$.

According to the construction of FIG. 6, one can maintain stable operational characteristics for the filter 13 as a whole even when there is a change in the operational characteristics of the laser amplifier itself. Obviously, this is due to the feedback control of the laser amplifier $13_{32}$ as described above. For the optical switches $13_{31}$ and $13_{33}$, one may use the directional coupler and saturable optical absorption switch that changes the transmittance in response to the injection of carriers.

Figure 9:
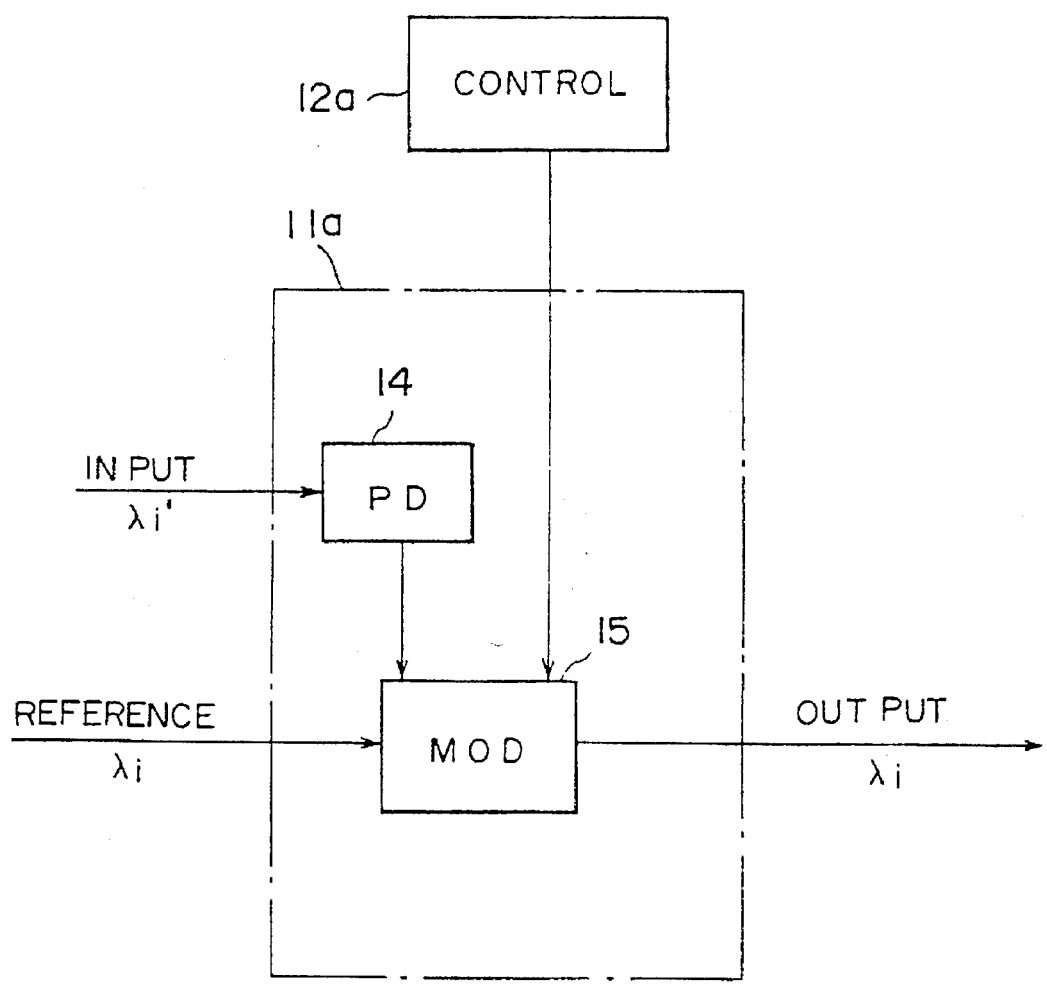
FIG. 9 is a block diagram showing the construction of the wavelength-synchronized optical processing device according to a second embodiment of the present invention.

FIG. 9 shows a wavelength-synchronized optical processing device according to a second embodiment of the present invention.

Referring to FIG. 9, the device includes an optical processing unit 11a and a control unit 12a, wherein the optical processing unit 11a uses the photodetector 14 for detecting the input optical beam that has the wavelength of $\lambda_i'$ similarly to the optical processing unit 11 of the first embodiment. This input optical beam may have the fluctuation in the wavelength $\lambda_i'$.

The output electric signal of the photodetector 14 is supplied to the optical modulator 15 that in turn is supplied with the reference optical beam of the wavelength $\lambda_i$. Thereby, the optical modulator 15 modulates the reference optical beam with the output electric signal of the photodetector 14, and an output optical beam carrying the optical signal of the original wavelength $\lambda_i'$ is obtained with a stabilized wavelength of $\lambda_i$. Further, the control unit 12a is used for controlling the operation of the optical modulator 15.

Figure 10:
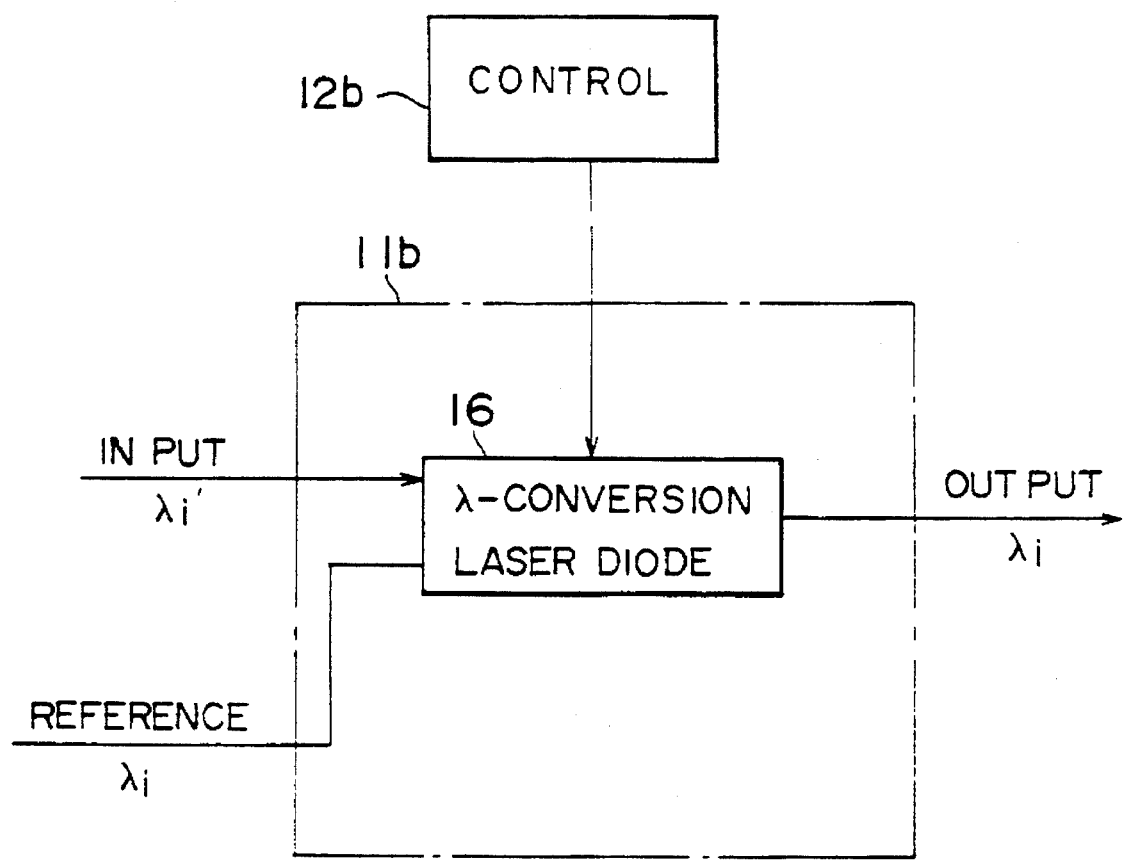
FIG. 10 is a block diagram showing the construction of the wavelength-synchronized optical processing device according to a third embodiment of the present invention.

FIG. 10 shows a wavelength-synchronized optical processing device according to a third embodiment of the present invention.

Referring to FIG. 10, the optical processing device is formed of an optical processing unit 11b and a control unit 12b, wherein there is provided a laser diode 16 that is controlled by the controller 12b. There, the laser diode is injected with the reference optical beam of the stabilized wavelength $\lambda_i$ and further with the input optical beam of the wavelength $\lambda_i'$ for producing an output optical beam carrying thereon the information modulated on the input optical beam, with the wavelength of $\lambda_i$. Thereby, the laser diode acts as the wavelength converter. Again, the optical signal of the wavelength $\lambda_i'$ and containing fluctuations is converted to the optical signal of the wavelength $\lambda_i$ that is free from fluctuation.

Figure 11:
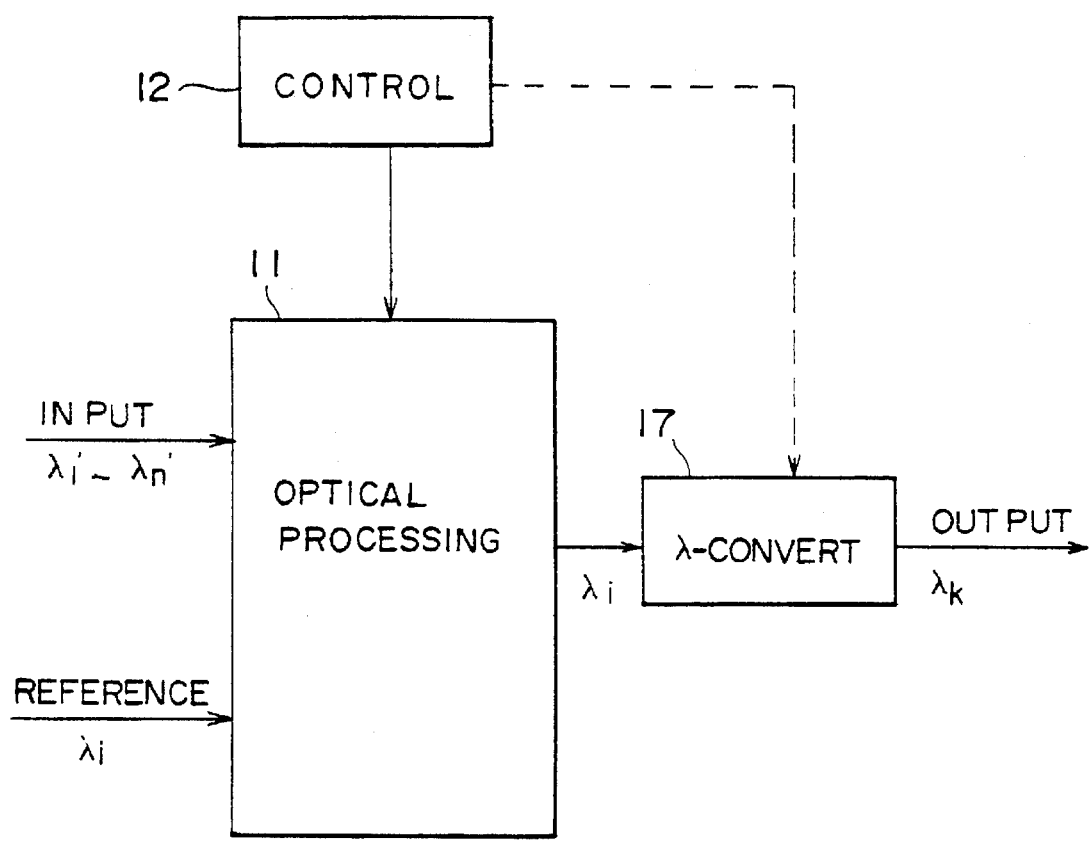
FIG. 11 is a block diagram showing the construction of the wavelength-synchronized optical processing device according to a fourth embodiment of the present invention.

FIG. 11 shows a fourth embodiment of the optical processing device according to the present invention.

Referring to FIG. 11, the optical processing device of the present embodiment has a construction similar to that of FIG. 3 except that there is provided a wavelength converter 17 after the optical processing unit 11 for converting the wavelength of the output optical beam from the wavelength $\lambda_i$ to another wavelength $\lambda_k$. By using the optical processing unit 11a or 11b described with reference to FIGS. 9 and 10 for the wavelength converter 17, one can obtain the output optical beam with the stabilized wavelength $\lambda_k$.

Figure 12:
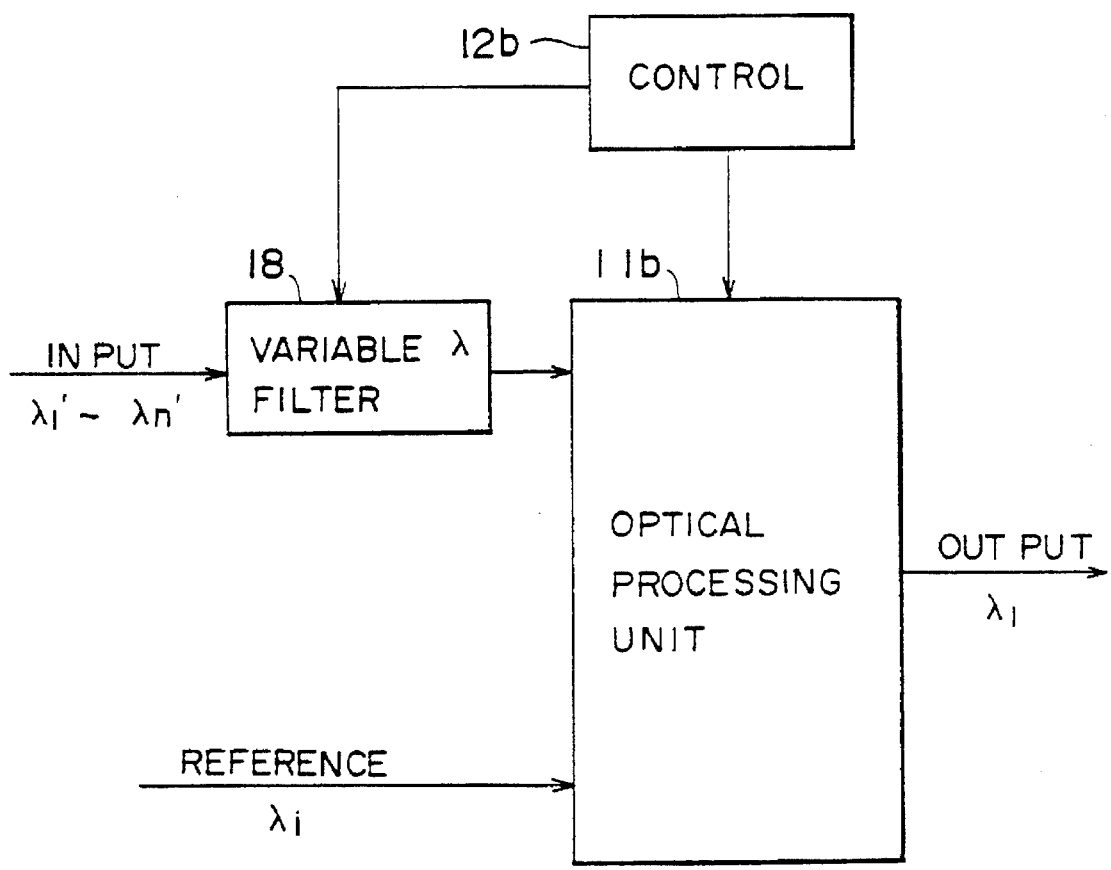
FIG. 12 is a block diagram showing the construction of the wavelength-synchronized optical processing device according to a fifth embodiment of the present invention.

FIG. 12, i.e., shows the optical processing device according to a fifth embodiment of the present invention.

Referring to the drawing, the optical processing device of the present embodiment has a structure similar to that of FIG. 10 except that there is provided a variable-wavelength filter 18 provided for filtering the input optical beam. As shown in FIG. 12, the variable-wavelength filter 18 is controlled by the controller 12b and selectively passes one of the optical signals multiplexed on the input optical beam with the respective wavelengths $\lambda_1'-\lambda_n'$. In this case, too, any of the desired optical signals that are multiplexed on the input optical beam in the wavelength-multiplex mode is converted to the desired, stabilized wavelength $_i$.

Figure 13:
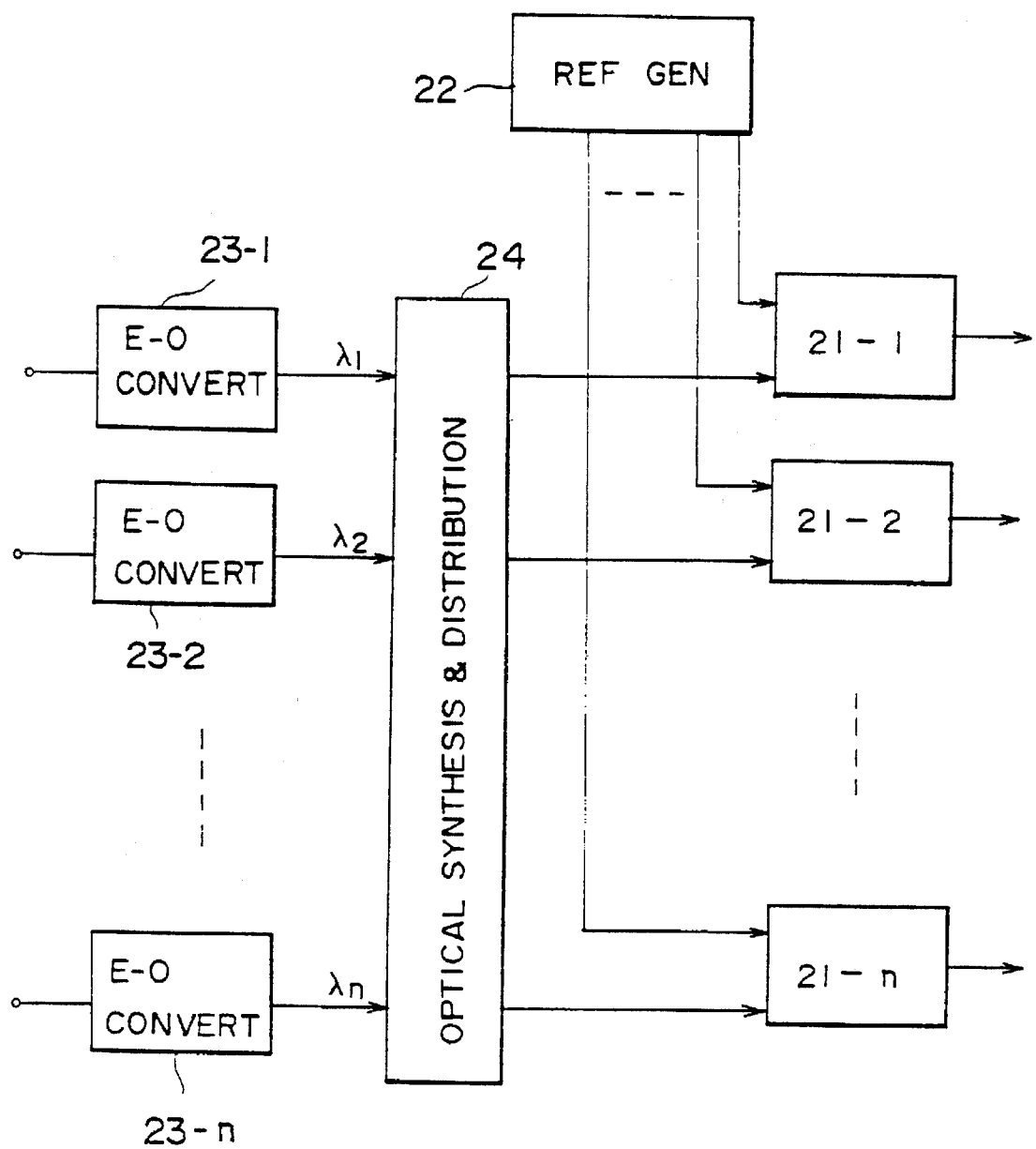
FIG. 13 is a block diagram showing the construction of the optical transmitter according to a sixth embodiment of the present invention that uses the wavelength-synchronized optical processing device.

FIG. 13 shows an optical path selector according to a sixth embodiment of the present invention, wherein a number of optical processing devices $21_1-21_n$ are used.

Referring to the drawing, the optical path selector of the present embodiment uses a number of electro-optic converters $23_1-23_n$, wherein each electro-optic converter may comprise a laser diode that produces an optical signal with a wavelength that is pertinent to the laser diode. Thus, the electro-optic converter $23_1$ produces the optical signal with a wavelength $\lambda_1$, the electro-optic converter $23_2$ produces the optical signal with a wavelength $\lambda_2$, . . . , and the electro-optic converter $23_n$ produces the optical signal with a wavelength $\lambda_n$. Further, the output optical signals of these electro-optic converters are supplied to an optical synthesis and distribution unit 24 that synthesizes a wavelength-multiplexed optical signal from these optical signals.

The output optical signals thus produced by the unit 24 are supplied to respective optical processing devices $21_1-21_n$, wherein each optical processing device $21_1-21_n$ has a construction similar to that of any of the wavelength-synchronized optical processing devices described previously. Further, there is provided a reference optical beam generator 22 that includes a number of stabilized laser diodes, each stabilized in terms of the temperature and bias current, and produces the reference optical beam with stabilized wavelengths.

The reference optical beam thus produced is supplied to the optical processing devices $21_1-21_n$ as the reference optical beam as described previously, and each optical processing device produces an output optical beam with the stabilized wavelength that is specified by the wavelength of the reference optical beam. Thus, when the reference optical beam having the wavelength $\lambda_1$ is supplied to the optical processing device $21_1$, the original optical signal having the wavelength $\lambda_1$ is selectively outputted to the optical transmission line connected to the optical processing device $21_1$ with the stabilized wavelength of $\lambda_1$. Alternatively, the optical processing device $21_1$ may be supplied with the optical output signal of the wavelength $\lambda_2$ from the electro-optic converter $23_2$ and output the same on the transmission line connected to the device $21_1$ with the stabilized wavelength of $\lambda_1$. The selection of the wavelength, of the input optical signal at the optical processing devices $21_1$–$21_n$ may be achieved by the control unit provided in each of the optical processing devices.

By multiplexing the output optical signals of the optical processing devices $21_1$–$21_n$ again, one can obtain a wavelength-multiplexed optical signal wherein the wavelength of each signal component is highly stabilized even when there is a fluctuation in the oscillation wavelength of the laser diode used in the electro-optic converters $23_1$–$23_n$. Thus, the system of the present embodiment is suited for use in optical path selectors or optical transmitters that send the wavelength-multiplex optical signals with stabilized wavelengths.

Figure 14:
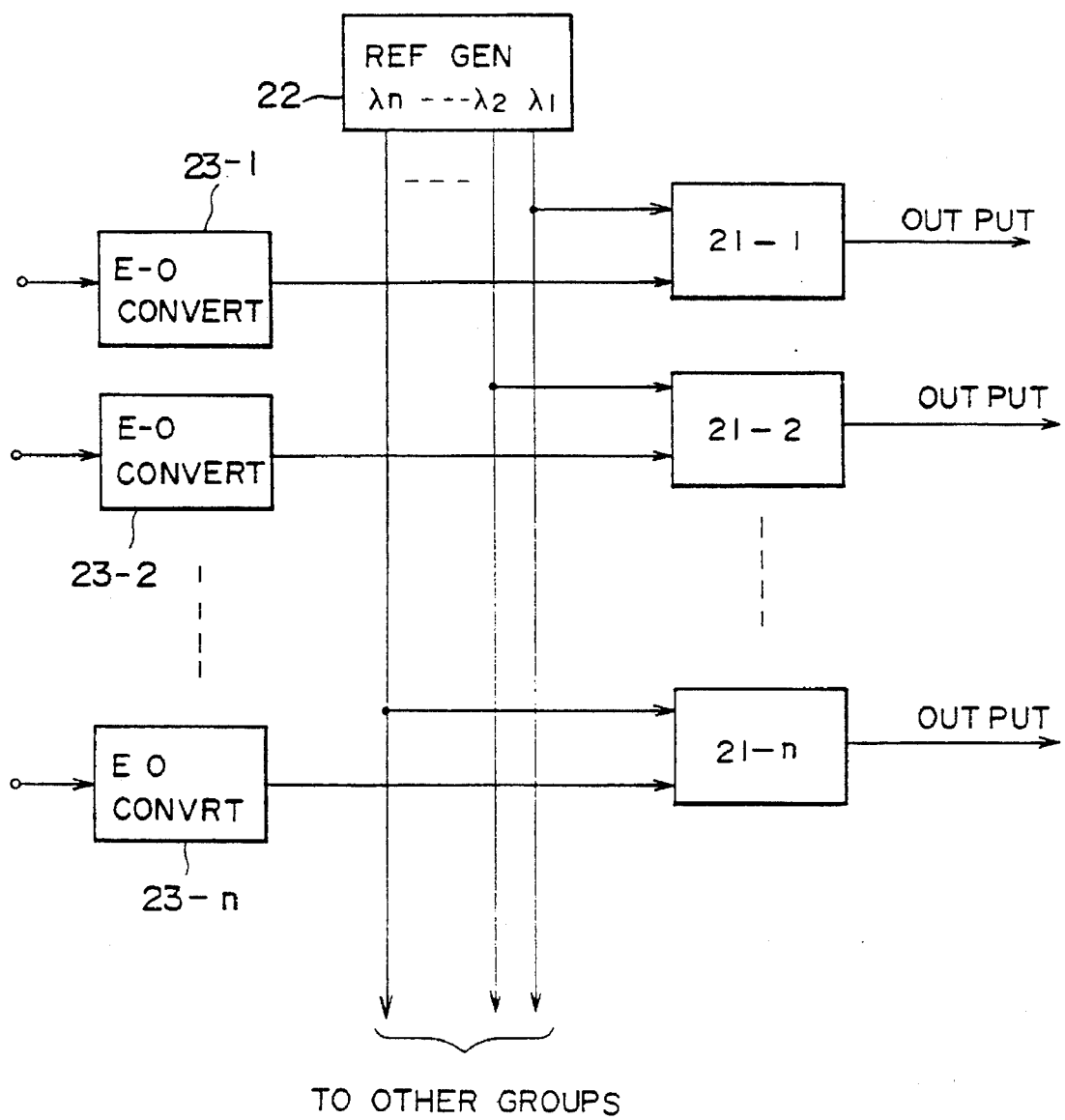
FIG. 14 is a block diagram showing the construction of the optical transmitter according to a seventh embodiment of the present invention that uses the wavelength-synchronized optical processing device.

FIG. 14 shows the block diagram of an optical transmitter according to a seventh embodiment of the present invention.

Referring to FIG. 14, there are provided a number of electro-optic converters wherein the electro-optic converters are grouped into a number of groups each group including a corresponding set of the electro-optic converters $23_1$–$23_n$. In each group, the output optical beams produced by these electro-optic converters are supplied to corresponding optical processing devices $21_1$–$21_n$ directly similar to the embodiment of FIG. 13. Further, the reference optical beam generator 22 produces the reference optical beams with the wavelengths of $\lambda_1, \lambda_2, \ldots, \lambda_n$ similar to the embodiment of FIG. 13. Thereby, the wavelengths $\lambda_1$–$\lambda_n$ are different from each other, in each group, and the reference optical beams are supplied to the optical processing devices of other groups in parallel.

In operation, the optical processing devices can produce the optical signals with any desired wavelengths by supplying thereto suitable reference optical beams from the generator 22. For example, one can obtain the output optical signal from the device $21_1$ by supplying the reference optical beam thereto with the wavelength of $\lambda_1$ (i.e., any desired one of $\lambda_1$–$\lambda_n$). Thus, the present embodiment is useful for the optical transmitters and the optical repeaters. Further, the system of FIG. 14 can be configured to form a number of optical channels each carrying the wavelength-multiplexed optical signals of the wavelengths of $\lambda_1$–$\lambda_n$.

Figure 15:
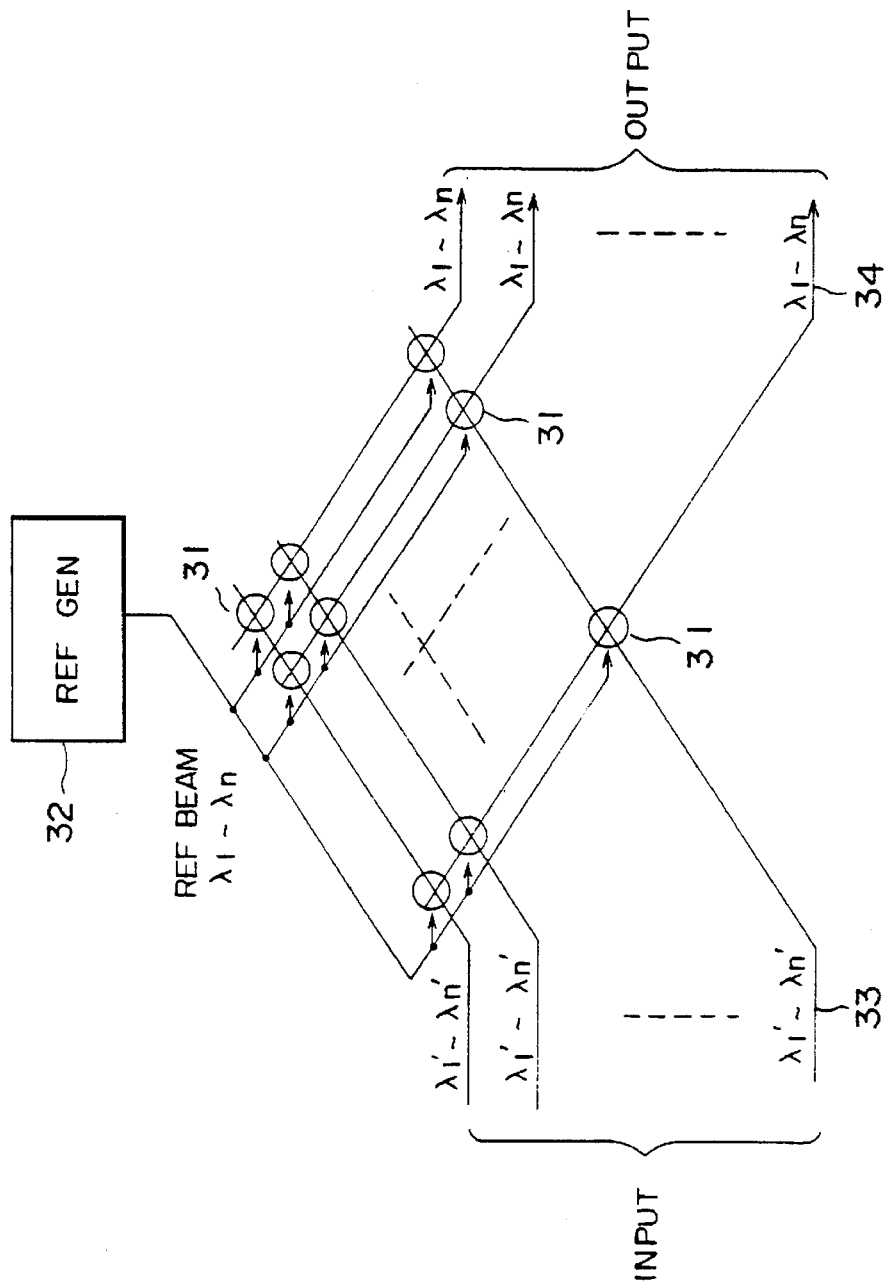
FIG. 15 is a block diagram showing the construction of an optical matrix switch according to an eighth embodiment of the present invention that uses the wavelength-synchronized optical processing device.

FIG. 15 shows an optical matrix switch according to an eighth embodiment of the present invention, wherein there are provided a number of optical transmission lines 33 at the input side and a number of optical transmission lines 34 at the output side. On each transmission line 33 of the input side respective wavelength-multiplexed optical signals are supplied with wavelengths $\lambda_1'$–$\lambda_n'$, while on each transmission line 34 of the output side respective wavelength-multiplexed optical signals are produced with wavelengths of $\lambda_1$–$\lambda_n$.

At each intersection of the transmission line 33 and the transmission line 34, there is provided a wavelength-synchronized optical processing device 31 that has a construction of any of the foregoing embodiments of FIGS. 3–12, and each optical processing device, 31 is supplied with a corresponding reference optical beam, produced by a reference optical beam generator 32 having a stabilized wavelength selected from the stabilized wavelengths of $\lambda_1$–$\lambda_n$. Thereby, the optical processing device 31 causes a transfer of the input optical signal of the selected wavelength from the transmission line 33 of the input side to the optical transmission line 34 of the output side, wherein the optical signal thus transferred has a stabilized wavelength that is specified by the wavelength of the reference optical beam.

It should be noted that each optical transmission line 34 carries thereon a number of wavelength multiplexed optical signals produced by a group of the optical processing devices 31 that are connected commonly to a single optical transmission line 34. Particularly, the group of the optical processing devices 31 that are provided commonly on one optical transmission line 33 are supplied with a single reference optical beam commonly, and the wavelength of the respective reference optical beam is different in each optical transmission line 33 relative to the other lines. Thereby, optical signals of different wavelengths are outputted on each optical transmission line 34 of the output side. Further, by selecting the combination of the wavelengths of the reference optical beams supplied to the devices 33 connected to a given one of the lines 34, one can output any optical signal which is on any optical transmission line 33, on any desired optical transmission line 34 with any desired wavelength.

Figure 16:
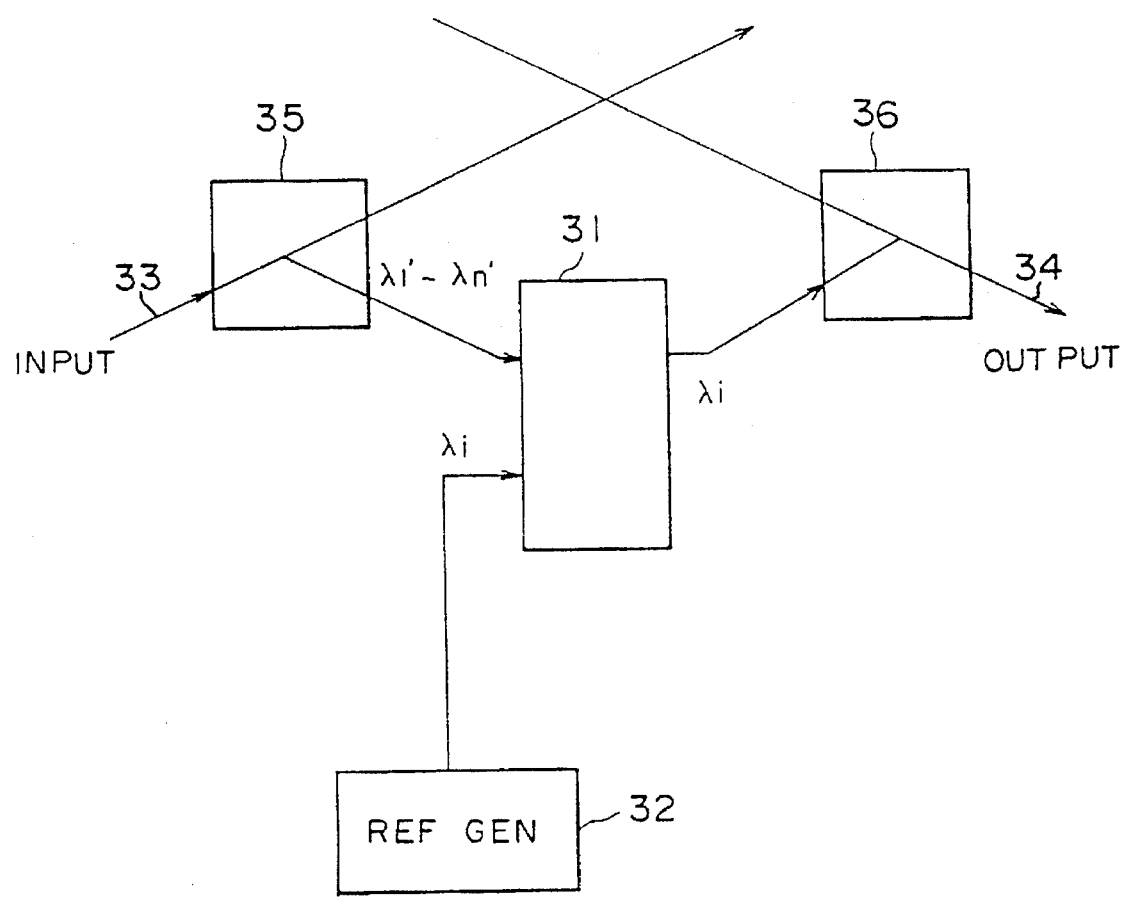
FIG. 16 is a block diagram of an essential part of the optical matrix switch of FIG. 15.

FIG. 16 shows the details of the optical matrix switch of FIG. 15.

Referring to FIG. 16, there is provided an optical divider 35 on the optical transmission line 33, in correspondence to each of the optical processing devices 31, for tapping the wavelength-multiplexed optical signals on the transmission line 33, and the optical signals thus tapped are supplied to the optical processing device 31. The optical processing device 31, selects one of the optical signals on the line 33 based on the reference optical beam of wavelength $\lambda_i$ as supplied thereto from the reference generator 32 and outputs the thus selected optical signal having the wavelength of the reference optical beam. The output optical beam of the optical processing device 31 in turn is supplied to an optical coupler 36 that is provided on the optical transmission line 34 in correspondence to each of the optical processing devices 31. The optical coupler 36 establishes an optical coupling between an optical fiber or waveguide that carries the optical output of the device 31 and the optical fiber or waveguide forming the optical transmission line 34, and the optical beam outputted from the optical processing device 31 is merged or wavelength-multiplexed onto the optical signals on the line 34. It should be noted that such an optical matrix switch can be constructed in the form of optical integrated circuit by forming the optical divider 35 and the optical coupler 36 together with the optical processing device 31 and the reference optical beam generator 32 on a common substrate.

Figure 17:
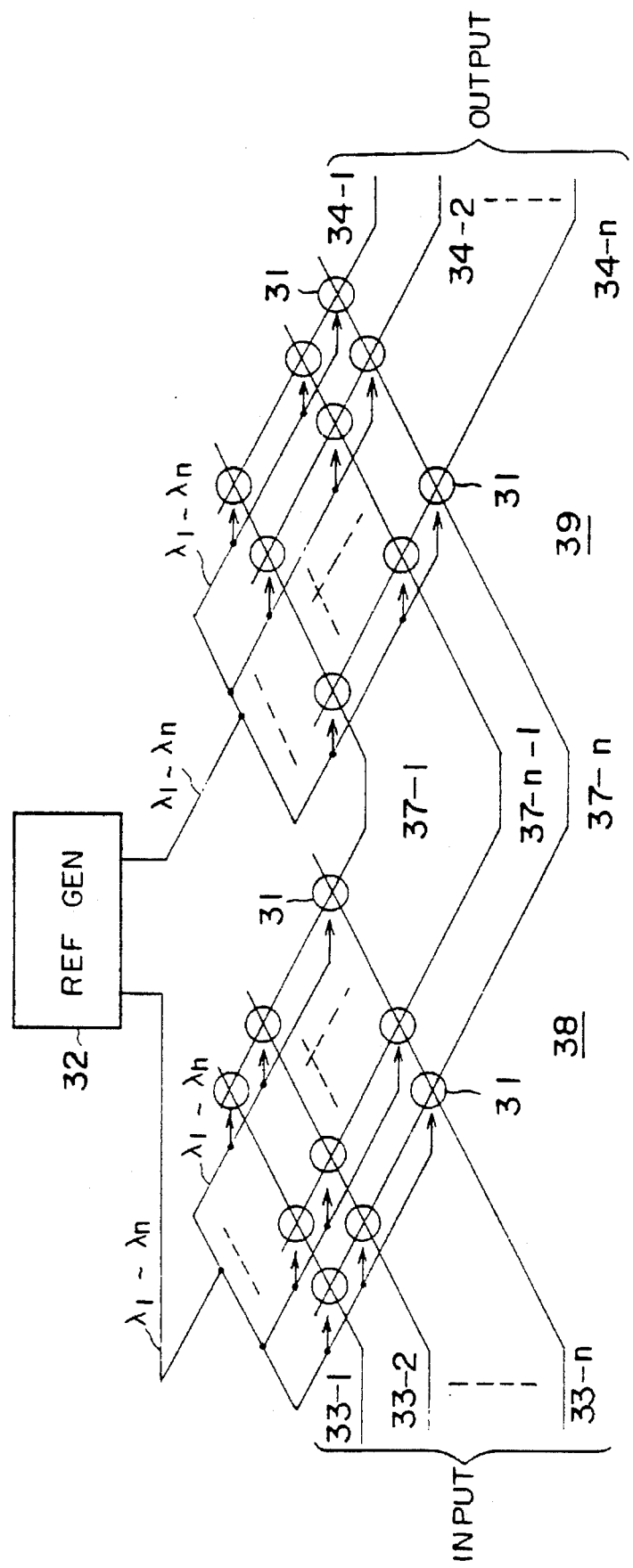
FIG. 17 is a block diagram showing the construction of an optical matrix switch according to a ninth embodiment of the present invention.

FIG. 17 shows an optical matrix switch according to a ninth embodiment of the present invention.

Referring to FIG. 17, two optical matrix switches 38 and 39, each having the construction of FIG. 16 are connected in series, wherein the matrix switches 38 and the matrix switches 39 are connected by intermediate optical transmission lines $37_1$–$37_n$. These optical transmission lines act as the optical transmission lines 37-1 to 37-n at the output side for the optical matrix switch 38 while acting simultaneously as the input side optical transmission lines for the optical matrix switch 39. Further, the reference optical beam generator 32 is used commonly for both the optical matrix switch 38 and the optical matrix switch 39, wherein the reference optical beam generator 32 supplies the reference optical beams to the optical matrix 38 and the optical matrix 39 independently.

As a typical example of operation, the reference optical beam having the wavelength of $\lambda_1$ is supplied to the group of the optical processing devices 31 that are located at the intersections formed between the line $33_1$ and the lines $37_1$–$37_n$, while the reference optical beam having the wavelength of $\lambda_2$ is supplied to the group of the optical processing devices 31 that are located at the intersections formed between the line $33_2$ and the lines $37_1$–$37_n$. Similarly, the (common) wavelength of the reference optical beams supplied to one group of the optical processing devices 31 that are provided on a common optical transmission line of the input side is to different from the (common) wavelength of the (common) reference optical beams that are supplied to each other group of the optical processing devices 31 that are provided commonly on each other input side optical transmission line. Thereby, the overlapping of the wavelength of the optical signals that are outputted commonly on an output side optical transmission line, such as the line $37_1$, is positively eliminated.

The optical signals thus outputted on the lines $37_1$–$37_n$ are then switched by the second optical matrix switch 39, wherein optical switching, similar to that described with reference to the optical matrix switch 38, is achieved. Thereby, output optical signals having respective wavelengths determined by the wavelengths of the reference optical beams supplied to the optical matrix switch 39 are obtained at the output optical transmission lines $34_1$–$34_n$. The wavelength of these output optical signals is of course stabilized by using the stabilized optical source for the reference optical beam generator 32.

Figure 18:
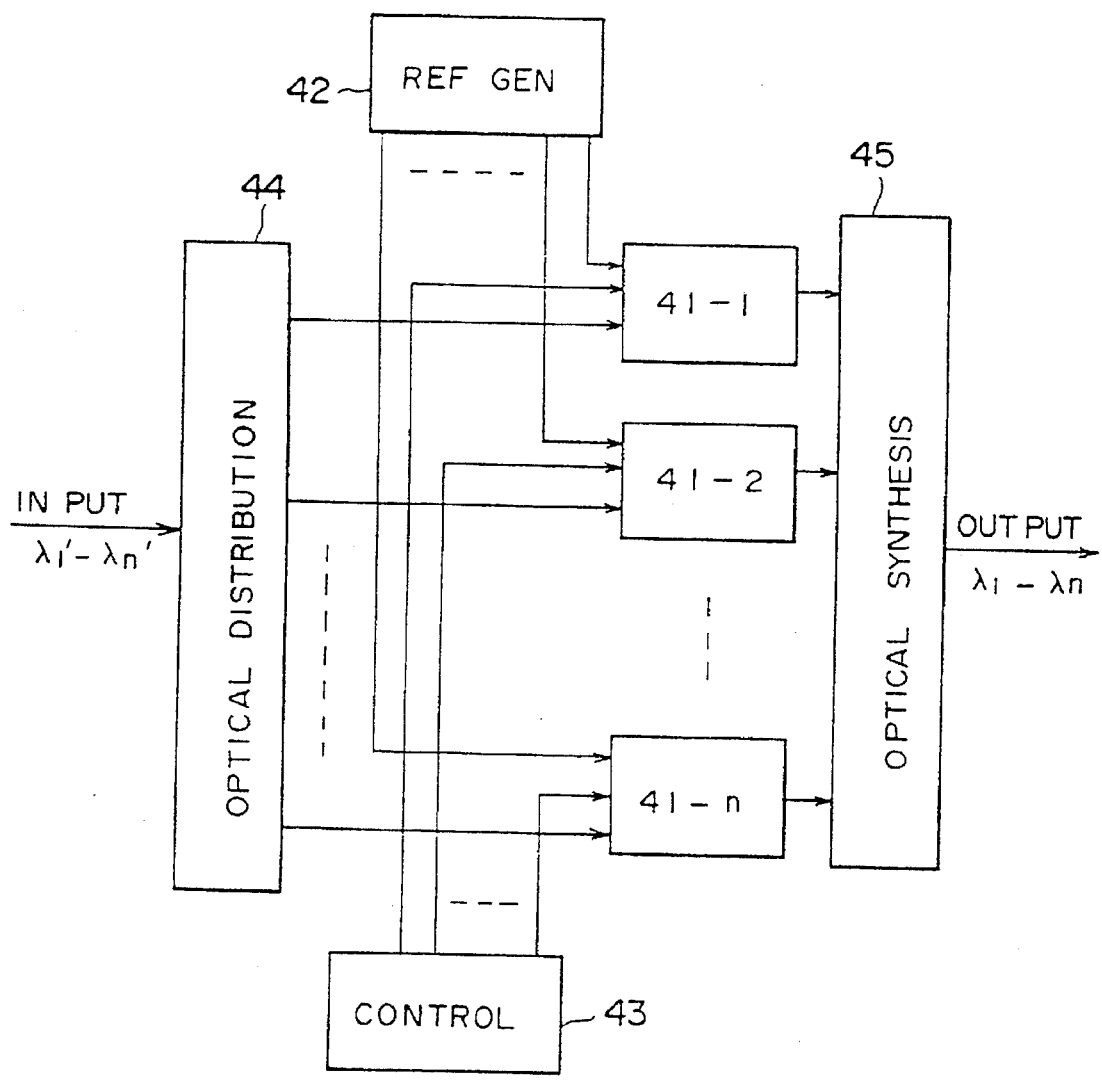
FIG. 18 is a block diagram showing the construction of the optical switching system according to a tenth embodiment of the present invention wherein the wavelength-synchronized optical processing device is used.

FIG. 18 shows a tenth embodiment of the present invention, comprising a wavelength converter for converting the wavelength of the optical signals modulated on the input optical beam in the wavelength-multiplexed mode and outputting the optical signals thus converted in the wavelength multiplexed mode.

Referring to FIG. 18, there are provided a number of optical processing devices $41_1$–$41_n$ each having the construction of any of the wavelength-synchronized optical processing devices described previously, wherein each of the optical processing devices $41_1$–$41_n$ is supplied with the wavelength-multiplexed optical signals from the optical distribution part 44, that in turn is supplied with an input optical beam carrying the wavelength-multiplexed signals and distributes the same to the optical processing devices $41_1$–$41_n$. Further, the optical processing devices $41_1$–$41_n$ are controlled by a control unit 43 that selects an optical signal from the wavelength-multiplexed optical signals. When the optical processing unit 11 (e.g. of FIG. 3) is used for the optical processing devices $41_1$–$41_n$, the control unit 43 controls a variable-wavelength filter similar to the filter 13 of FIG. 3. Thereby, the control unit 43 acts as the control unit 12 of FIG. 3.

Further, there is provided a reference optical beam generator 42 that produces the reference optical beam with the wavelengths $\lambda_1, \lambda_2, \ldots, \lambda_n$ and supplies the same to the respective optical processing devices 41-1, 41-2, 41-n. In response to the reference optical beams thus supplied, the optical processing devices $41_1$–$41_n$ produce output optical beams supplied thereto in coincidence with respective wavelengths of the reference optical beams. The output optical beams thus produced are added in an optical synthesis unit 45 that produces an output optical beam on which the optical signals are modulated in the wavelength multiplexed mode.

In the system of the present embodiment, it should be noted that one can convert the optical signal of the wavelength $\lambda_i$ to the optical signal having the stabilized wavelength $\lambda_j$. For example, one can convert the optical signal of the wavelength $\lambda_1$ to the optical signal of the wavelength $\lambda_n$ and the optical signal of the wavelength $\lambda_2$ to the optical signal of the wavelength $\lambda_1$.

Figure 19:
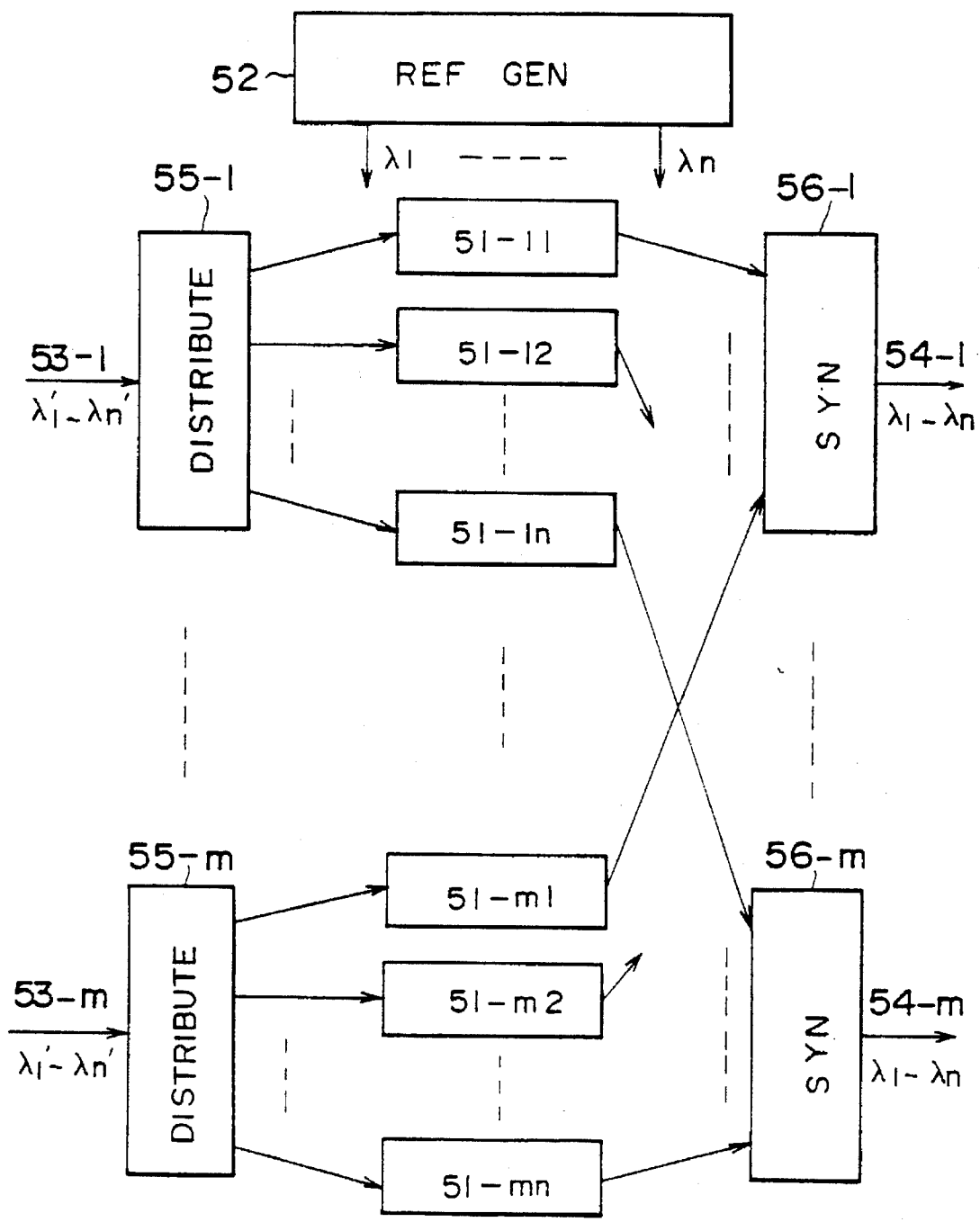
FIG. 19 is a block diagram showing the construction of the optical switching system according to an eleventh embodiment of the present invention.

FIG. 19 shows an eleventh embodiment of the present invention.

Referring to FIG. 19, the optical processing system of the present embodiment includes a number of wavelength-synchronized optical processing devices $51_{11}$–$51_{mn}$, as described previously with reference to FIGS. 3–12, and a reference optical beams generator 52 for producing the reference optical beam.

In the present embodiment, there are a number of optical transmission lines $53_1$–$53_m$ at the input side, wherein each transmission line is connected to a corresponding optical distribution unit $55_1$–$55_m$ and supplies thereto a wavelength-multiplexed input optical beam. Similarly to previous cases, the input optical beam carries thereon the optical signals of the wavelengths $\lambda_1'$–$\lambda_n'$.

Each optical distribution unit such as the unit $55_1$ is connected to a number of optical processing devices such as $51_{11}$–$51_{1n}$ for supplying the wavelength-multiplexed optical signals to each of these devices. The optical processing devices are supplied with the reference optical beams from the reference optical beam generator 52 of respective, selected wavelengths and produce corresponding output optical signals with the respective wavelengths specified by the respective wavelengths of the corresponding reference beams.

More particularly, the reference optical beam of the wavelength $\lambda_1$ is supplied to the optical processing devices $51_{11}$–$51_{1n}$ commonly, the reference optical beam of the wavelength $\lambda_2$ is supplied to the optical processing devices $51_{21}$–$51_{2n}$ (not shown) commonly, . . . and the reference optical beam of the wavelength $\lambda_n$ is supplied to the optical processing devices $51_{m1}$–$51_{mn}$, commonly. Thereby, all the output optical signals produced by the optical processing devices $51_{11}$–$51_{1n}$ have the wavelength $\lambda_1$, all the output optical signals produced from the optical processing devices $51_{21}$–$51_{2n}$ have the wavelength $\lambda_2, \ldots$, and all the output optical signals from the optical processing devices $51_{m1}$–$51_{mn}$ have the wavelength of $\lambda_n$.

In the present embodiment, the optical output of each optical processing device is supplied to a corresponding optical synthesis unit such that each optical synthesis unit is supplied with optical signals of mutually different wavelengths from respective different optical processing devices. For example, the output optical signal of the optical processing device $51_{11}$ is supplied to an optical synthesis unit $56_1$, the optical output of the optical processing device $51_{12}$ is supplied to an optical synthesis unit $56_2$ (not shown) . . . and the optical output of the optical processing device $51_{1n}$ is supplied to an optical synthesis unit $56_m$. It should be noted that all the optical output signals mentioned above have the wavelength of $\lambda_1$.

When viewed from the side of the optical synthesis unit, the optical synthesis unit $56_1$ is supplied with the output optical signals from the optical processing devices $51_{11}$, $51_{21}, \ldots 51_{m1}$ with the wavelengths of $\lambda_1, \lambda_2, \ldots \lambda_n$ and produces an output optical beam on which these optical signals are multiplexed in the wavelength-multiplexed mode. Similarly, the optical synthesis unit $56_m$ is supplied with the output optical signals from the optical processing devices $51_{1n}, 51_{2n}, \ldots 51_{mn}$ with respective wavelengths of $\lambda_1, \lambda_2, \ldots \lambda_n$ and produces an output optical beam on which the optical signals are multiplexes in the wavelength-multiplexed mode. Thereby, the system of FIG. 19 converts the wavelength of the optical signals from $\lambda_1'-\lambda_n'$ to $\lambda_1-\lambda_n$ and simultaneously stabilizes the wavelength of the output optical signals. It should be noted that any combination of the optical signals supplied on the input side optical transmission lines $53_1-53_m$ can be obtained on each of the output side transmission lines $54_1-54_m$ in the form of wavelength-multiplexed optical signals.

FIG. 20 is a block diagram showing the construction of an optical information transmission system wherein an optical matrix switch 61 having the construction of FIG. 15 or FIG. 17 is used.

Referring to FIG. 20, there are provided a number of optical transmission terminals $62_1-62_m$ connected to the input side optical transmission lines of the optical matrix switch 61. Further, a number of optical reception terminals $63_1-63_m$ are connected to the output side optical transmission lines of the matrix switch 61.

Each optical transmission terminal such as the terminal $62_1$ includes an optical transmitter 64 for producing a number of optical signals with respective wavelengths $\lambda_1-\lambda_n$ and an optical synthesizing unit 65 supplied with the optical signals for producing a wavelength-multiplexed optical beam from the optical signals. On the other hand, each optical reception terminal such as the terminal $63_1$ includes an optical distribution unit 66 supplied with the wavelength-multiplexed optical signals from the optical matrix switch 61 and a variable-wavelength filter 67 for selecting an optical signal of a specific wavelength. Further, there is provided a photodetector 68 in connection with the filter 67 for detecting the optical signal that has passed through the filter 67.

By controlling the optical matrix switch 61 in accordance with control information such as the address information, the path and the wavelength of the optical signals are switched in the matrix switch 61. More specifically, one can switch a huge number of channels (number of wavelength multiplex signals×number of transmission lines) simultaneously by using the system of FIG. 20.

Figure 21:
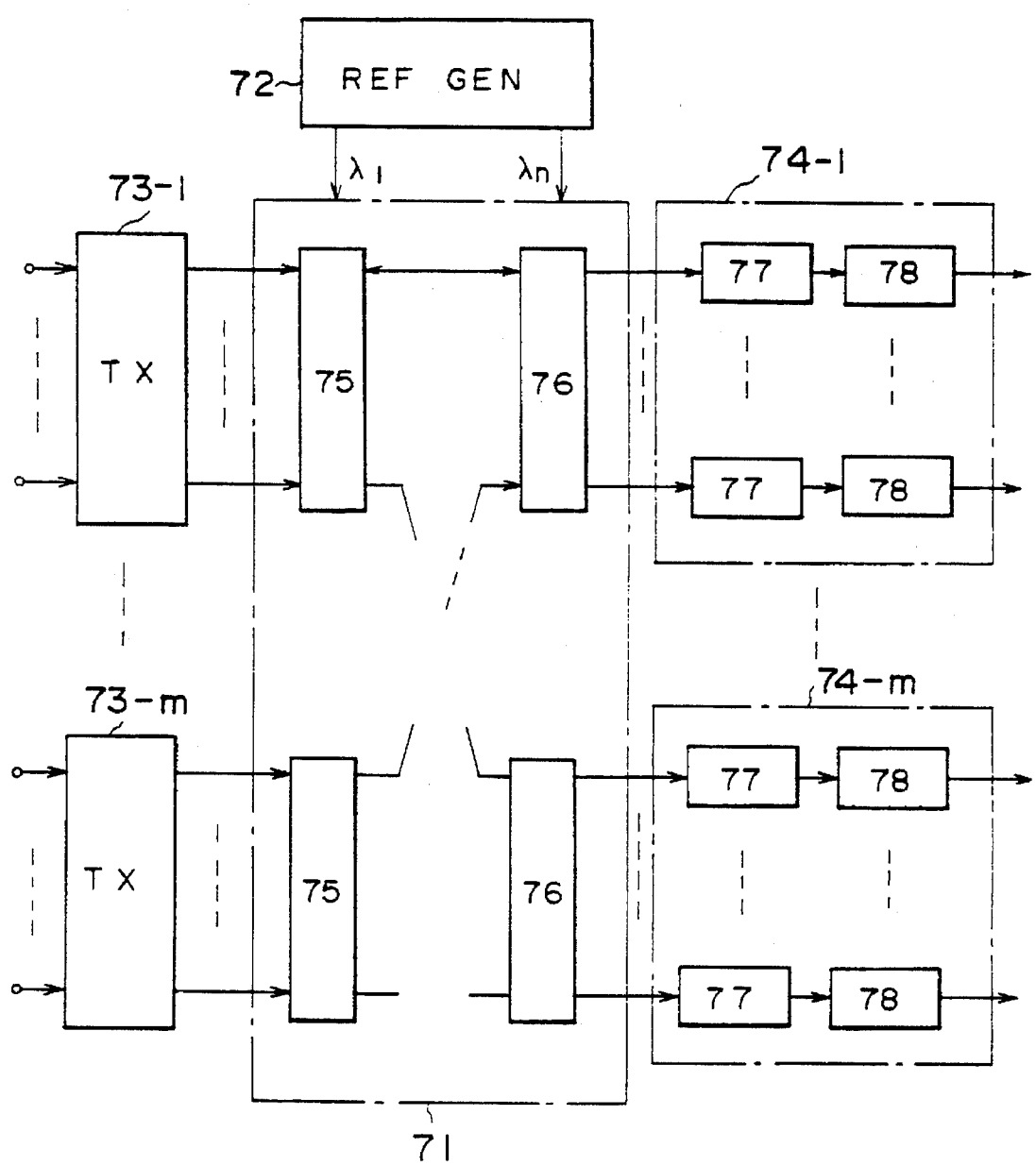
FIG. 21 is a block diagram showing the construction of the optical transmission system according to a thirteenth embodiment of the present invention wherein the wavelength-synchronized optical processing device is used.

FIG. 21 shows a thirteenth embodiment of the present invention.

Referring to FIG. 21, the system of the present embodiment is also an optical transmission system, wherein there are provided a number of transmission terminals $73_1-73_m$ each supplied with electric signals and producing optical signals in correspondence to the electric signals with respective wavelengths.

The output optical signals of the terminals $73_1-73_m$ are supplied to an optical path selector 71 that includes a number of optical synthesis and distribution units 75, 76 respectively provided in correspondence to the transmission terminals $73_1-73_m$ and the reception terminals $74_1-74_m$. The optical path selector 71 has a construction similar to the system shown in FIG. 19, and the output optical signals of each transmission terminal are mixed to form a wavelength-multiplexed optical signal similar to the embodiment of FIG. 19. Further these wavelength-multiplexed optical signals are selected by the optical processing devices similar to the devices of $51_{11}-51_{mn}$ and are distributed further to a number of optical synthesis and distribution units 76 provided in correspondence to the optical reception terminals $74_1-74_m$. In FIG. 21, the optical processing devices are not illustrated for the sake of clarity of the drawing. There, any combination of the optical signals produced by the optical transmission terminals $73_1-73_m$ is obtained at the output of each optical synthesis and distribution unit 76 in the form of the wavelength-multiplexed optical signals.

The optical output thus obtained then selectively passes through a filter 77 and is detected by a photodetector 78. In this case, too, one can switch a large number of connections, of which the number is given by the product of the number of wavelength-multiplex signals and the number of optical transmission lines or channels, simultaneously.

Further, the present invention is not limited to the embodiments described heretofore, but various variations and modifications may be made without departing from the scope of the invention.

What is claimed is:

1. An optical path selector system for switching a path of an optical signal, comprising:

a plurality of electro-optic conversion devices receiving and converting respective electrical signals to corresponding optical signals with respective, different wavelengths and produced as outputs thereof;

an optical multiplexor supplied with and multiplexing the output optical signals of the electro-optic conversion devices and thereby forming a wavelength-multiplexed optical signal containing said optical signals with the respective, different wavelengths as component optical signals, said optical multiplexor having a plurality of output ports and distributing the wavelength-multiplexed optical signal to said plurality of output ports;

a plurality of optical processing devices, each connected to a corresponding one of said plurality of output ports and receiving said wavelength-multiplexed optical signal therefrom, each of said plurality of optical processing devices receiving a reference optical beam having a reference wavelength and selecting an optical signal of a predetermined wavelength from said wavelength-multiplexed optical signal and outputting the selected optical signal with a wavelength determined by said reference wavelength; and a reference optical beam generator which produces said reference optical beam and supplies the same to said plurality of optical processing devices with respective wavelengths.

2. An optical path selector system for switching a path of an optical signal, comprising:

a plurality of electro-optic conversion devices receiving and converting respective electrical signals to corresponding optical signals with respective, different wavelengths and produced as outputs thereof, said plurality of electro-optic conversion devices being arranged in a plurality of groups, each group including a plurality of electro-optic conversion devices;

a plurality of optical processing devices each connected to a corresponding one of said plurality of electro-optic conversion devices and receiving said optical signal, said optical processing devices being arranged in a plurality of groups corresponding to the plurality of groups of the electro-optic conversion devices, each of said plurality of optical processing devices being supplied with a reference optical beam having a reference wavelength and selecting an optical signal of a predetermined wavelength from said optical signal and outputting the selected optical signal with a wavelength determined by said reference wavelength; and a reference optical beam generator generating said reference optical beam with respective, different wavelengths, said reference optical beam generator supplying the reference optical beams of respective, different wavelengths to corresponding ones of said plurality of optical processing devices of each group thereof, for the plurality of groups of said optical processing devices.

3. An optical matrix switch for switching a wavelength-multiplexed optical beam carrying thereon a number of optical signals of different wavelengths, comprising:

a plurality of first optical transmission lines, each supplied with an input wavelength-multiplexed optical signal and transmitting the same, said input wavelength-multiplexed optical signal containing therein a plurality of input optical signals with respective, different wavelengths;

a plurality of second optical transmission lines, each supplied with an output wavelength-multiplexed optical signal and transmitting the same, said output wavelength-multiplexed optical signal containing therein a plurality of output optical signals with respective, different wavelengths, each of said second optical transmission lines intersecting with said plurality of first optical transmission lines at respective nodes;

a plurality of optical processing devices provided in correspondence to each node, each of said optical processing devices being supplied with a reference optical beam having a reference wavelength and selecting an optical signal having a predetermined wavelength pertinent to said device, from the input wavelength-multiplexed optical signal for converting said wavelength of the selected optical signal to a second wavelength that is specified by said reference wavelength, said optical processing device, further, outputting the same on said second optical transmission line connected to the respective node; and a reference optical beam generator for producing the reference optical beam and supplying the same to the optical processing devices such that the output optical signals, as output on each second optical transmission line, have the respective, different wavelengths.

4. An optical matrix switch for switching a wavelength-multiplexed optical beam carrying thereon a number of optical signals of respective, different wavelengths, comprising:

a plurality of first optical transmission lines, each supplied with an input wavelength-multiplexed optical signal and transmitting the same, said input wavelength-multiplexed optical signal containing therein a plurality of input optical signals with respective, different wavelengths;

a plurality of second optical transmission lines, each supplied with an intermediate wavelength-multiplexed optical signal and transmitting the same, said intermediate wavelength-multiplexed optical signal containing therein a plurality of intermediate optical signals with respective, different wavelengths, each of said second optical transmission lines intersecting with said plurality of first optical transmission lines at respective, first type nodes;

a plurality of first group optical processing devices corresponding to each first type node, each of said first group optical processing devices being supplied with a reference optical beam having a reference wavelength and selecting an optical signal, having a predetermined wavelength pertinent to said device, from the input wavelength-multiplexed optical signal thereby to convert said wavelength of the selected optical signal to a second wavelength that is specified by said reference wavelength, each of said first group optical processing devices, further, outputting the same on said second optical transmission line connected to the first type node as the optical signal forming the intermediate wavelength-multiplexed optical signal;

a plurality of third optical transmission lines, each supplied with an output wavelength-multiplexed optical signal and transmitting the same, said output wavelength-multiplexed optical signal containing therein a plurality of output optical signals with respective, different wavelengths, each of said third optical transmission lines intersecting with said plurality of second optical transmission lines at respective, second type nodes;

a plurality of second group optical processing devices corresponding to each second type node, each of said second group optical processing devices being supplied with a reference optical beam having a reference wavelength and selecting an optical signal, having a predetermined wavelength pertinent to said device, from the intermediate wavelength-multiplexed optical signal thereby to convert said wavelength of the selected optical signal to a third wavelength that is specified by said reference wavelength, each of said second group optical processing devices, further, outputting the same on said third optical transmission line connected to the second type node as said output wavelength-multiplexed optical signal; and a reference optical beam generator generating the reference optical beam and supplying the same to the optical processing devices such that the optical signals in the intermediate wavelength-multiplexed optical signal have the respective, different wavelengths and such that the optical signals in the output wavelength-multiplexed optical signal have the respective, different wavelengths.

5. An optical channel switching system for selecting a path of an optical signal in a wavelength-multiplexed optical signal, comprising:

a plurality of input-side optical transmission lines, each transmitting a wavelength-multiplexed optical signal;

an optical distributor connected to each of said input-side optical transmission lines and distributing the wavelength-multiplexed optical signals to a plurality of output ports;

a plurality of optical processing devices connected to the corresponding output ports of the optical distributor and receiving the wavelength-multiplexed optical signal therefrom, each of said optical processing devices receiving a reference optical beam having a reference wavelength and selecting an optical signal having a predetermined wavelength from said wavelength-multiplexed optical signal and each said optical processing device, further, converting the wavelength of the selected optical signal from said predetermined wavelength to another wavelength specified by the reference wavelength and thereby producing a corresponding output optical signal;

a reference optical beam generator generating the reference optical beam and supplying the same to the plurality of optical processing devices such that the respective output optical signals of the optical processing devices have respective, mutually different wavelengths; and an optical multiplexor supplied with the respective output optical signals from the optical processing devices and merging the thus-supplied optical signals thereby to form an output wavelength-multiplexed optical signal.

6. An optical information transmission system, comprising:

an electro-optic convertor receiving and converting a plurality of electric signals to corresponding optical signals having respective, different wavelengths;

an optical multiplexor receiving and multiplexing said plurality of optical signals to form a wavelength-multiplexed optical signal that contains therein input optical signals corresponding to the optical signals of the electro-optic convertor having respective, different wavelengths;

an optical matrix switch comprising:

a plurality of first optical transmission lines, each supplied with the wavelength-multiplexed optical signal from the optical multiplexing means as an input wavelength-multiplexed optical signal and transmitting the same, a plurality of second optical transmission lines, each supplied with an intermediate wavelength-multiplexed optical signal and transmitting the same, said intermediate wavelength-multiplexed optical signal containing therein a plurality of intermediate optical signals with respective, different wavelengths, each of said second optical transmission lines intersecting with said plurality of first optical transmission lines at respective first type nodes, a plurality of first group optical processing devices respectively corresponding to each first type node, each of said first group optical processing devices being supplied with a reference optical beam having a reference wavelength and selecting an optical signal having a predetermined wavelength pertinent to said device from the input wavelength-multiplexed optical signal for converting said wavelength of the selected optical signal to a second wavelength that is specified by said reference wavelength, each of said first group optical processing devices further outputting the same on said second optical transmission line connected to the first type node as the optical signal forming the intermediate wavelength-multiplexed optical signal, a plurality of second group optical processing devices provided in correspondence to each second type node, each of said second group optical processing devices being supplied with a reference optical beam having a reference wavelength and selecting an optical signal having a predetermined wavelength pertinent to said device from the intermediate wavelength-multiplexed optical signal for converting said wavelength of the selected optical signal to a third wavelength that is specified by said reference wavelength, each of said second group optical processing devices further outputting the same on said third optical transmission line connected to the second type node, a plurality of third optical transmission lines, each supplied with an output wavelength-multiplexed optical signal and transmitting the same, said output wavelength-multiplexed optical signal containing therein a plurality of output optical signals with respective, different wavelengths, each of said third optical transmission lines intersecting with said plurality of second optical transmission lines at the respective second type nodes, and a reference optical beam generator for producing the reference optical beam and supplying the same to the optical processing devices such that the optical signals in the intermediate wavelength-multiplexed optical signal have the respective, different wavelengths and such that the optical signals in the output wavelength-multiplexed optical signal have the respective, different wavelengths;

an optical distributor connected to each of the third optical transmission lines, receiving the output wavelength-multiplexed optical signal therefrom and distributing the same to a plurality of output ports;

a plurality of filtering devices, each connected to the output port of the optical distributor for separating an optical signal that has a specified wavelength from the wavelength-multiplexed optical signal outputted at the output port, said specified wavelength being determined for each filtering device; and a plurality of photodetection devices corresponding to said plurality of filtering devices, each photodetection device detecting the optical signal selected by the corresponding filtering device and producing, as an output thereof, an electrical signal in response to the detection.

* * * * *